US011487271B2

United States Patent
Bi et al.

(10) Patent No.: US 11,487,271 B2
(45) Date of Patent: Nov. 1, 2022

(54) MACHINE LEARNING WITH FAST FEATURE GENERATION FOR SELECTIVE LASER MELTING PRINT PARAMETER OPTIMIZATION

(71) Applicant: Dassault Systemes Simulia Corp, Waltham, MA (US)

(72) Inventors: Jing Bi, Foxborough, MA (US); Victor George Oancea, East Greenwich, RI (US)

(73) Assignee: Dassault Systemes Simulia Corp., Johnston, RI (US)

( * ) Notice: Subject to any disclaimer, the term of this patent is extended or adjusted under 35 U.S.C. 154(b) by 235 days.

(21) Appl. No.: 16/855,186

(22) Filed: Apr. 22, 2020

(65) Prior Publication Data

US 2020/0341452 A1 Oct. 29, 2020

Related U.S. Application Data

(60) Provisional application No. 62/838,114, filed on Apr. 24, 2019, provisional application No. 62/837,452, filed on Apr. 23, 2019.

(51) Int. Cl.
*G05B 19/4099* (2006.01)
*G06N 20/00* (2019.01)
(Continued)

(52) U.S. Cl.
CPC ........ *G05B 19/4099* (2013.01); *B29C 64/153* (2017.08); *B29C 64/393* (2017.08);
(Continued)

(58) Field of Classification Search
CPC ..... G05B 19/4099; B33Y 50/02; G06F 30/10; G06N 20/00
(Continued)

(56) References Cited

U.S. PATENT DOCUMENTS 7,308,385 B2 * 12/2007 Wegerich ........... G05B 23/0254
702/182
10,792,810 B1 * 10/2020 Beckman ................. B25J 9/163
(Continued)

OTHER PUBLICATIONS

Buys, Koen, et al. "Virtual data generation based on a human model for machine learning applications." Proceedings of the international Digital Human Modeling Symposium. 2013.pp. 1-9 (Year: 2013).*
(Continued)

*Primary Examiner* — Satish Rampuria
(74) *Attorney, Agent, or Firm* — Sheehan Phinney Bass & Green PA

(57) ABSTRACT

A method includes identifying machine process parameters for an additive manufacturing process to produce a part, providing a real-world sensor to sense a characteristic associated with a real-world version of the additive manufacturing process, receiving sensor readings from the real-world sensor while the machine is performing the real-world version of the additive manufacturing process, generating, with a computer-based processor, physics-based features associated with the additive manufacturing process, and training a machine-learning software model based at least in part on the machine process parameters, the sensor readings, and the physics-based features to predict a behavior of the real-world sensor.

30 Claims, 18 Drawing Sheets

(51) Int. Cl.
    G06F 30/10      (2020.01)
    B33Y 50/02      (2015.01)
    B29C 64/153     (2017.01)
    B29C 64/393     (2017.01)
    G06F 30/27      (2020.01)
    G06F 119/18     (2020.01)
    G06F 111/18     (2020.01)
    G06F 113/10     (2020.01)

(52) U.S. Cl.
    CPC .............. *B33Y 50/02* (2014.12); *G06F 30/10* (2020.01); *G06F 30/27* (2020.01); *G06N 20/00* (2019.01); *G05B 2219/49023* (2013.01); *G06F 2111/18* (2020.01); *G06F 2113/10* (2020.01); *G06F 2119/18* (2020.01)

(58) Field of Classification Search
    USPC .................................................. 700/94–129
    See application file for complete search history.

(56) References Cited

U.S. PATENT DOCUMENTS

| | | | | |
|---|---|---|---|---|
| 10,800,040 | B1* | 10/2020 | Beckman | B25J 9/1671 |
| 10,921,782 | B2* | 2/2021 | Mehr | G06N 20/00 |
| 2018/0341248 | A1* | 11/2018 | Mehr | G05B 13/048 |
| 2018/0349527 | A1* | 12/2018 | Li | B25J 9/161 |
| 2019/0188346 | A1* | 6/2019 | Mirabella | B23K 26/354 |
| 2019/0227525 | A1* | 7/2019 | Mehr | G06N 20/10 |

OTHER PUBLICATIONS

Adeshina, Yusuf O., Eric J. Deeds, and John Karanicolas. "Machine learning classification can reduce false positives in structure-based virtual screening." Proceedings of the National Academy of Sciences 117.31 (2020): pp. 18477-18488. (Year: 2020).*

Nikolaev, E. I., et al. "Using virtual data for training deep model for hand gesture recognition." Journal of Physics: Conference Series. Vol. 1015. No. 4. IOP Publishing, 2018.pp.1-6 (Year: 2018).*

Zhang, Wentai, et al. "Machine learning enabled powder spreading process map for metal additive manufacturing (AM)." 2017 International Solid Freeform Fabrication Symposium. University of Texas at Austin, 2017.pp.1235-1249 (Year: 2017).*

Stanisavljevic, Darko, et al. "Detection of interferences in an additive manufacturing process: an experimental study integrating methods of feature selection and machine learning." International Journal of Production Research 58.9 (2020): pp. 2862-2884. (Year : 2020).*

Jiang, Jingchao, et al. "Achieving better connections between deposited lines in additive manufacturing via machine learning." Math. Biosci. Eng 17.4 (2020): pp. 3382-3394. (Year: 2020).*

Amini Mohammadhossein et al; "MLCPM: A Process Monitoring Framework for 3D metal printing in industrial scale", Computers & Industrial Engineering, Pergamon Amsterdam, NL vol. 124 Jul. 26, 2018.

Partial Search Report for EP20171184; dated Oct. 8, 2020.

L. Scime and J. Beuth, Using machine learning to identify in-situ melt pool signatures indicative of flaw formation in a Taser powder bed fusion additive manufacturing process. Additive Manufacturing, vol. 25, Jan. 2019, pp. 151-165.

C. Gobert, E. W.Reutzel, J. Petrich, A. R.Nassar, S. Phoha, Application of supervised machine learning for defect detection during metallic powder bed fusion additive manufacturing using high resolution imaging. Additive Manufacturing, vol. 21, May 2018, pp. 517-528.

K. Aoyagi, H. Wang, A. Chiba, H. Sudo, Simple Method to Construct Process Maps for Additive Manufacturing Using Support Vector Machine. Additive Manufacturing, Mar. 14, 2019.

Zhixiong Li, Ziyang Zhang, Junchuan Shi, Dazhong Wu, Prediction of surface roughness in extrusion-based additive manufacturing with machine learning. Robotics and Computer-Integrated Manufacturing, vol. 57, Jun. 2019, pp. 488-495.

Ikenna A.Okaro, Sarini Jayasinghe, Chris Sutcliffe, Kate Black, Paolo Paoletti, Peter L. Green, Automatic fault detection for laser powder-bed fusion using semi-supervised machine learning. Additive Manufacturing, vol. 27, May 2019, pp. 42-53.

Jack Francis, Linkan Bian, Deep Learning for Distortion Prediction in Laser-Based Additive Manufacturing using Big Data. Manufacturing Letters, vol. 20, Apr. 2019, pp. 10-14.

Binbin Zhang, Prakhar Jaiswal, Rahul Rai, Paul Guerrier, George Baggs, (2019) "Convolutional neural network-based inspection of metal additive manufacturing parts", Rapid Prototyping Journal, https://doi.org/10.1108/RPJ-04-2018-0096.

Kappes B., Moorthy S., Drake D., Geerlings H., Stebner A. (2018) Machine Learning to Optimize Additive Manufacturing Parameters for Laser Powder Bed Fusion of Inconel 718. Proceedings of the 9th International Symposium on Superalloy 718 & Derivatives: Energy, Aerospace, and Industrial Applications, pp. 595-610.

Mahmoudi M, Ezzat A, Eiwany A. (2019) Layerwise Anomaly Detection in Laser Powder-Bed Fusion Metal Additive Manufacturing. ASME. J. Manuf. Sci. Eng.

Evdokia Popova, Theron M. Rodgers, Xinyi Gong, Ahmet Cecen, Jonathan D. Madison, Surya R. Kalidindi, Process-Structure Linkages Using a Data Science Approach: Application to Simulated Additive Manufacturing Data. Integrating Materials and Manufacturing Innovation, Mar. 2017, vol. 6, Issue 1, pp. 54-68.

* cited by examiner

Based on machine process parameters and photodiode sensor data AND physics-based features AND a CAD model Based on machine process parameters and photodiode sensor data alone

MACHINE LEARNING WITH FAST FEATURE GENERATION FOR SELECTIVE LASER MELTING PRINT PARAMETER OPTIMIZATION

CROSS-REFERENCE TO RELATED APPLICATION(S)

This application claims the benefit of priority to U.S. Provisional Patent Application Ser. No. 62/837,452, filed Apr. 23, 2019, and entitled MACHINE LEARNING SERVICE BASED ON V+R DATA, and claims the benefit of priority to U.S. Provisional Patent Application Ser. No. 62/838,114, filed Apr. 24, 2019, and entitled MACHINE LEARNING WITH FAST FEATURE GENERATION FOR SELECTIVE LASER MELTING PRINT PARAMETERS OPTIMIZATION. The disclosures of the prior applications are incorporated by reference herein in their entireties.

FIELD OF THE INVENTION

This application relates to machine learning and, more particularly, relates to machine learning based on virtual and real data.

BACKGROUND

On hardware, sensor values are used for controls (e.g., aircraft flight control or manufacturing control). Today cyber-physical control systems are typically designed using virtual models. Therefore, it can be important to predict sensor values accurately. Moreover, the manufacturing industry is challenged by producing production parts of acceptable quality early on—e.g., the first time through.

Complexities associated with the additive manufacturing processes in particular include a large number of print parameters and fast evolving physics happening at different scales, such as material phase transformation and porosity at melt pool level and distortions and residual stresses development at part level. Often, using physical simulations to predict all quality metrics is also costly.

SUMMARY OF THE INVENTION

In one aspect, a method includes identifying machine process parameters for an additive manufacturing process to produce a part, providing a real-world sensor to sense a characteristic associated with a real-world version of the additive manufacturing process, receiving sensor readings from the real-world sensor while the machine is performing the real-world version of the additive manufacturing process, generating, with a computer-based processor, physics-based features associated with the additive manufacturing process, and training a machine-learning software model based at least in part on the machine process parameters, the sensor readings, and the physics-based features to predict a behavior of the real-world sensor.

In some implementations, the physics-based features include an energy flux feature and an effective conduction feature. The energy flux feature generally corresponds to an amount of energy delivered into a zone of interest during a particular period of time in the additive manufacturing process. The effective conduction feature generally corresponds to an ability to dissipate energy introduced into a zone of interest via thermal conduction.

In another aspect, a system includes a computer including a computer-based processor and a computer-based memory storing computer-executable instructions that, when executed by the computer-based processor, cause the computer-based processor to generate physics-based features associated with an additive manufacturing process. The system includes one or more machines are configured to perform a real-world version of the additive manufacturing process based on machine process parameters associated with the additive manufacturing process, a real-world sensor to sense a characteristic associated with the real-world version of the additive manufacturing process, and a machine-learning software model trained to predict a behavior of the real-world sensor based on the physics-based features, the machine process parameters, and sensor readings from the real-world sensor during the real-world-version of the additive manufacturing process.

In some implementations, one or more of the following advantages are present.

For example, highly accurate sensor predictions are possible. Moreover, these predictions are possible without having to model the exact workings of the sensor with first principals and without having to put forth extensive calibration efforts. The highly accurate sensor predictions can be achieved efficiently. Once trained, the prediction models can be used in a variety of ways including, to optimize machine process parameters, to detect sensor anomalies, and/or support subsequent system simulations.

Moreover, in certain implementations especially, the techniques disclosed herein provide for fast training and fast predictions of sensor behavior. This is particularly helpful in situations where available time is limited but accuracy and precision are desirable.

Additionally, in some implementations, the systems and techniques disclosed herein provide an easy to use tool that can help to quickly assess print quality for any newly designed part. Moreover, in some implementations, optimized print parameters, for example, it may be possible, relying on the systems and techniques disclosed herein to generate optimized machine parameters in a machine readable format directly, without involving a complicated simulation analysis to model complex processes.

Other features and advantages will be apparent from the description and drawings, and from the claims.

BRIEF DESCRIPTION OF THE DRAWINGS

Like reference characters refer to like elements.

DETAILED DESCRIPTION

This application relates to systems and processes that relate to predicting the behavior of a sensor in a process being performed by a real world machine or system (hereinafter "machine"). The process can be a manufacturing process or any other kind of process that has at least one sensor to sense a characteristic associated with the process. The machine can be any machine or system that is configured to perform the process and that includes the sensor. As an example, in the additive manufacturing industry, three-dimensional (3D) printing machines typically include a photodiode sensor to sense light at or near the melt pool of the 3D printer. The light level measured by the photodiode sensor is related to the amount of heat being delivered into the melt pool. The 3D printing industry generally considers data collected by photodiode sensors in a 3D printer as an indicator of part quality for the printed parts. Other examples of processes to which the systems and methods disclosed herein may be applicable include self-driving of vehicles, spacecraft processes, and many others.

Figure 1:
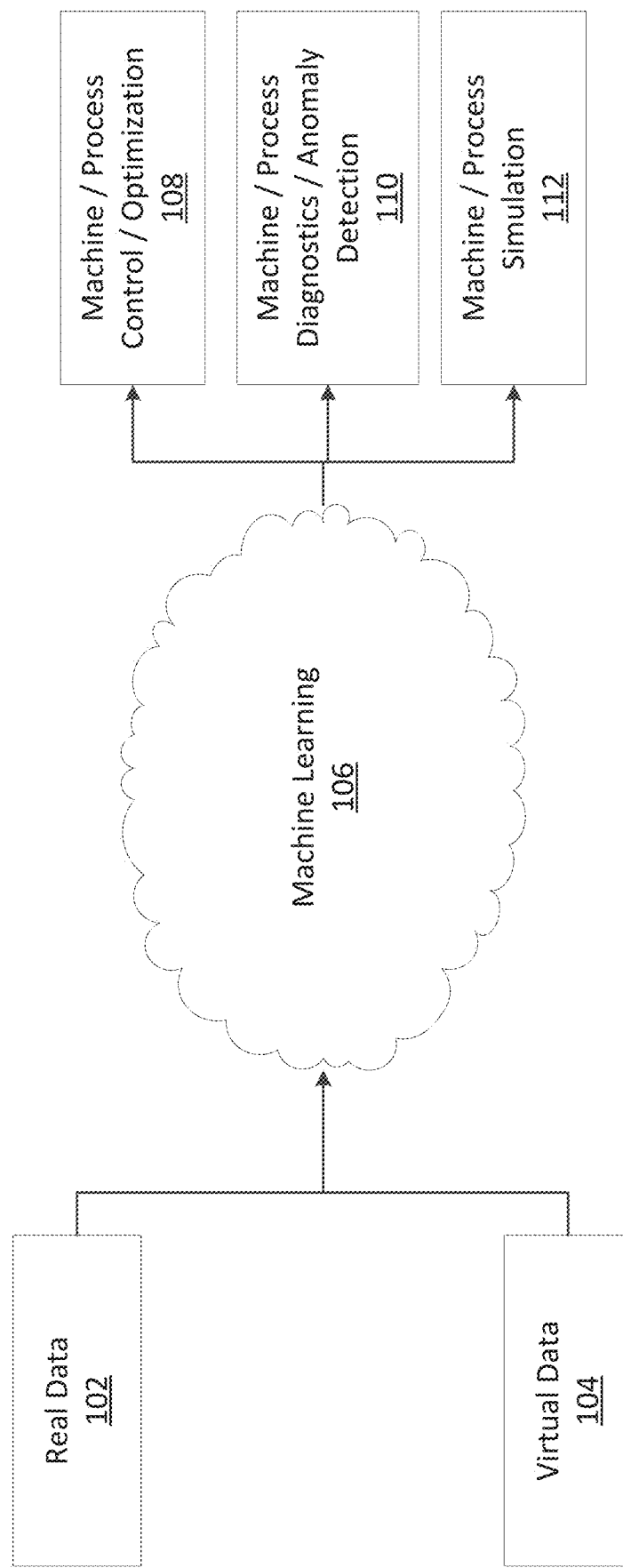
FIG. 1 is a schematic representation of a method that includes leveraging both real data and virtual data about a process to train a machine-learning software model 106 to be able to predict the behavior of a sensor in a real-world version of the process.

FIG. 1 is a schematic representation of a method that includes leveraging both real data 102 and virtual data 104 about a process to train a machine-learning software model 106 to be able to predict the behavior of a sensor in a real-world version of the process. Once trained, according to FIG. 1, the machine-learning software model 106 can be applied to any one of a variety of possible uses including, for example, controlling/optimizing a machine (at 108) to perform the same type of process or a different type of process, diagnosing a machine or a sensor in the machine (at 110), and/or simulating aspects of the machine/sensor's behavior or process under various operating parameters (at 112). Other uses are possible as well, of course. Moreover, in some implementations, the machine-learning software model 106 may be used for one or more of these processes while it continues to be trained. The continued training, in those instances, would continue to evolve the machine-learning software model 106 to even better predict sensor behavior.

In a typical implementation, the systems and methods disclosed herein (e.g., as represented schematically in FIG. 1) result in highly accurate sensor predictions. Moreover, in certain implementations, these predictions can be made very quickly, which is particularly important in situations where there is limited time available for extensive training of the machine-learning software model 106. In those situations, highly-accurate predictions can be achieved despite the limited time available during the real time process. This makes the systems and methods disclosed herein very valuable in a wide variety of different applications.

The real data 102 that is leveraged to train the machine-learning software model 106 can be any type of data that comes from a real world version of a process. There are a variety of possible sources for the real data 102.

One possible source of the real data 102 is a real world version of the sensor whose behavior the machine-learning software model 106 is learning to predict. Typically, this kind of real world sensor would be deployed in an operating machine to sense one or more conditions produced by the machine while it is performing the process at issue. For example, in an additive manufacturing setting such as 3D printing, the machine-learning software model 106 may be training to predict the behavior of a photodiode sensor in the 3D printer that is configured to sense light (as an indicator of heat energy being delivered into the object being printed) in the 3D printer. In those implementations, the real data may include actual data collected by the photodiode sensor during the 3D printing process.

Another possible source of the real data 102 is process parameters or settings on the real world machine to implement the process. In the 3D printing example mentioned above, process parameters may include information or settings on the 3D printer related to one or more of the following: laser exposure time, point to point distance, laser power, laser speed, and laser strategy including contouring and hatching/infill pattern, radial step, offset, direction and sequencing, etc. Certain process parameters or machine settings might be relevant to training the machine-learning software model 106 to predict the behavior of the photodiode sensor in the 3D printer example because they influence the amount of heat delivered into the part being printed. Other process parameters, in the 3D printing context or other types of processes, may be relevant as well.

The real data 102 may come from other sources as well.

The virtual data 104 used to train the machine-learning software model 106 generally comes from a simulation or virtual modeling of one or more aspects of the process or machine at issue.

The simulation that produces the virtual data 104 is typically performed by a computer-based simulator and can be relatively simple or refined. Simpler simulations tend to be faster, which can be desirable in certain circumstances, but contain less detail. Complex and refined simulations provide more detail in terms of the interactions of physical phenomena, but tend to take more time. In general, the simulation approach should be tailored to the requirements of a particular situation.

In a relatively simple simulation, for example, the simulator may calculate virtual data 104 in the form of one or more physics-based features (e.g., features relating to the underlying physics of the process at issue) based on easy to obtain process information including, for example, one or more of the process parameters mentioned above. A physics-based feature typically cannot be directly measured and may not be readily measurable in an accurate manner with a physical sensor. Some examples of physics-based features applicable in 3D printing context include some measure of the energy being introduced to a part being printed within a particular window in time, and some measure of the part's ability to dissipate the energy being introduced via thermal conduction.

More complex simulations may be performed by a sophisticated computer-based simulator, such as the Powder Bed Fabrication and Additive Manufacturing Scenario software application, which is part of the 3DEXPERIENCE® software platform available from Dassault Systèmes SE. The Powder Bed Fabrication software application is able to generate virtual data 104 in the form of high resolution machine tool path information based from a computer-aided design (CAD) model and, in some instances, other input data. The high resolution machine tool path information generated in this regard can include information similar to the process parameters mentioned above, for example, information related to one or more of the following: laser exposure time, point to point distance, laser power, laser speed, and laser strategy including contouring and hatching/infill pattern, radial step, offset, direction and sequencing, etc. Additive Manufacturing Scenario software application is able to generate virtual data 104 in the form of high fidelity physics information based from a computer-aided design (CAD) model, machine tool path information and, in some instances, other input data. The high fidelity physics information generated in this regard can include virtual data of physical quantities, for example, temperature field, melt pool dimension, material phase transformation and content, mechanical distortion, residual stress and strain, etc.

In some implementations, the virtual data 104 can include a combination of physics-based features and information from a more sophisticated computer-based simulator.

The real data 102 and the virtual data 104 is generally collected in computer-based memory, for example, and utilized in connection with training the machine-learning software model 106 to be able to predict real world behavior of the sensor (e.g., a photodiode sensor in 3D printer) for various computer-aided designs (CAD) models under various operating conditions.

Figure 2:
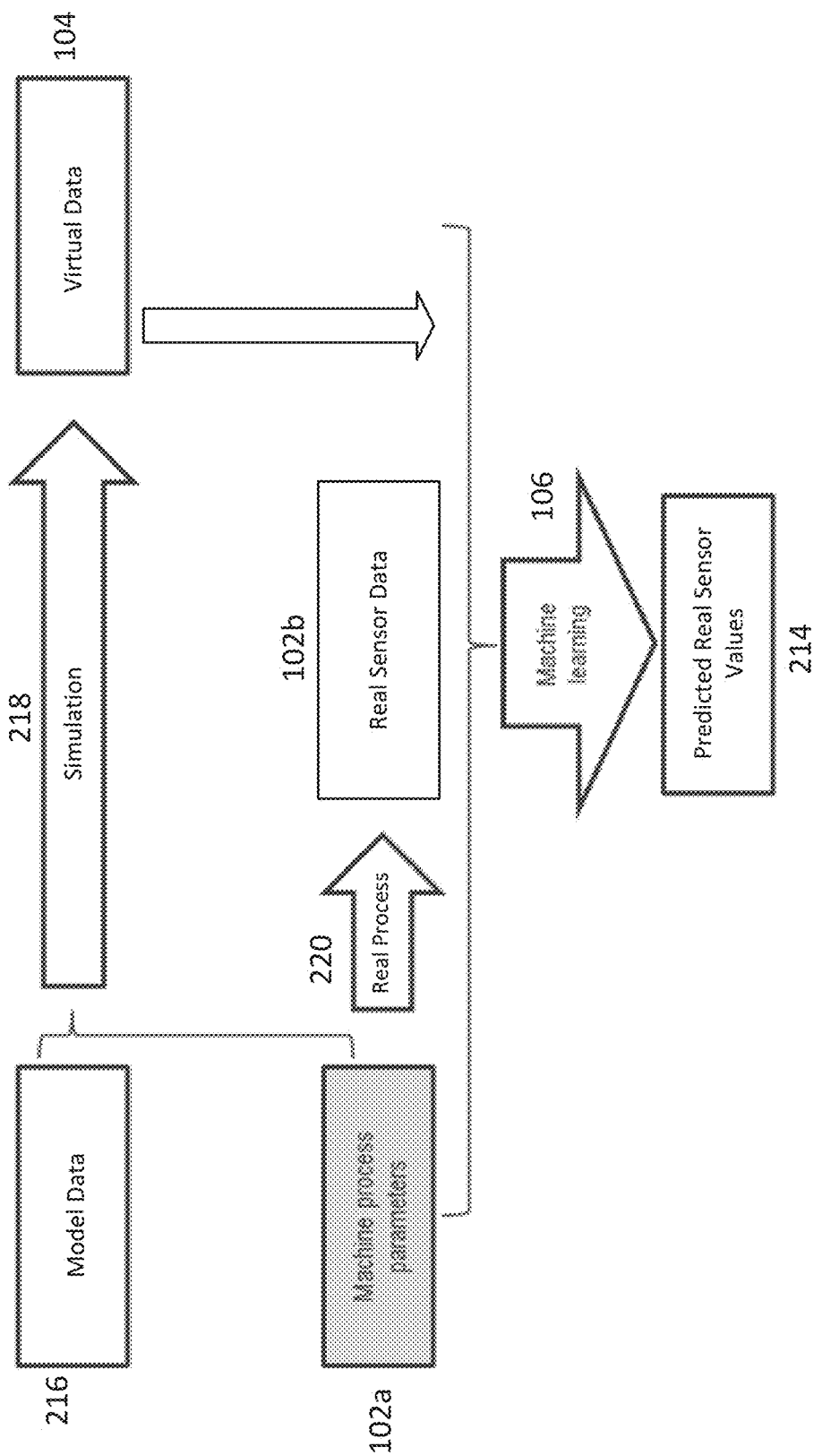
FIG. 2 is a schematic representation of a more detailed representation of the method represented in FIG. 1.

FIG. 2 is a schematic representation of a more detailed representation of the method represented in FIG. 1.

The method represented in FIG. 2 includes leveraging both real data (in the form of machine process parameters 102a and real sensor data 102b) and virtual data 104 regarding a process to train a machine-learning software model 106 to be able to predict (at 214) the behavior of a real world sensor in a real-world version of the process.

The method includes providing the machine process parameters 102a and/or model data (at 216) to facilitate a simulation (at 218) of the process to generate the virtual data 104. As an example, the model data can be a computer-aided design (CAD) model of a product to be manufactured by a 3D printing process. However, the model data can be virtually any other collection of information about a real world process that can be used to help simulate the process. In general, if the process to be simulated will include a machine operating on process parameters, then those process parameters 102a may be provided into the simulation (at 218) as well. In some implementations, the simulation (at 218) may be performed solely based on machine process parameters.

The illustrated method also includes performing the real process (at 220). A sensor is provided to sense some characteristic of the process. The sensor in this regard may be deployed inside a machine that is used to perform the process or some aspect of the process. Performing the process (at 220), therefore, produces more real data, in the form of real sensor data 102b.

The real data (including the machine process parameters 102a and the real sensor data 102b) and the virtual data 104 produced by the simulation (at 218) are fed into the machine-learning software model 106 to train the machine-learning software model 106 to be able to predict the behavior of the sensor.

Once trained, according to the illustrated implementation, the machine-learning software model 106 predicts real sensor values. These predictions can be made by the machine-learning software model 106 based on any combination of real data 102 (other than real sensor data because real sensor data will not be available for a process that has not yet occurred) and/or virtual data 104. The machine-learning software model 106 in this regard behaves like a transfer function modeling the sensor behavior for any possible combination of model and machine or process inputs.

The techniques disclosed herein are, of course, applicable to a wide range of possible applications. One such application is additive manufacturing such as 3D printing. The nature of 3D printing is such that there may not be a lot of time available to do extensive training of a machine-learning software model 106 or simulation/modeling the exact physics of the 3D printing process, the 3D printer, and/or the photodiode sensor in the 3D process.

Figure 3:
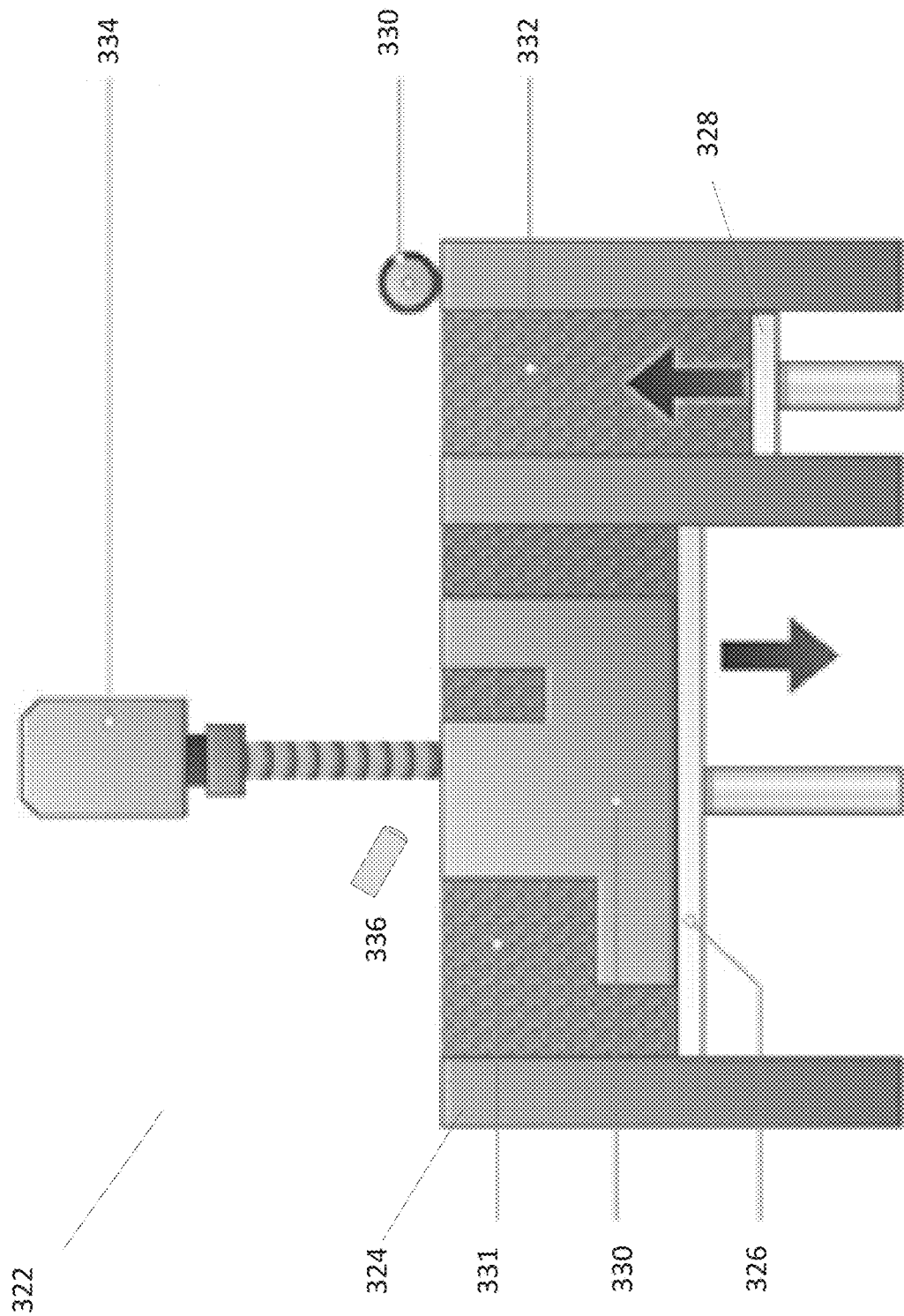
FIG. 3 is a schematic cross-sectional view of an exemplary three-dimensional (3D) printer.

FIG. 3 is a schematic cross-sectional view of an exemplary 3D printer 322.

The illustrated 3D printer 322 is generally configured to produce functional engineering components (parts) one layer at a time from computer aided design (CAD) data. In a typical implementation, the 3D printer 322 produces a volume of material in a layer-wise manner by ting a material feedstock (e.g., powder, e, etc.) with an energy source (e.g., a laser, an electron beam, an electric arc, etc.) that follows a tool path derived from the CAD model.

The 3D printer 322 in the illustrated implementation includes a housing 324 that defines a pair of internal cylinders, a build platform 326 that is movable in a vertical piston-like manner within a first one of the cylinders relative to the housing 324, a new powder stock platform 328 that is movable in a vertical piston-like manner within a second one of the cylinders, and a powder roller 330. In a typical implementation, during operation the new powder stock platform 328 pushes new powder stock 332 up, the build platform 326 moves in a downward direction, and the powder roller 330 rolls the new powder away from the new powder stock over the powder bed 331.

The 3D printer in the illustrated implementation has a heat source 334, which may be a laser, an electron beam source, etc. During operation, the heat source 334 moves across the top of the powder bed directing heat energy (e.g., in the form of a laser beam) onto different portions of the powder bed to melt the upper layer of powder in various portions of the powder bed. Heat from the heat source melts the powder as it moves across the powder bed. After the laser passes a particular spot on the powder bed, the melted powder cools and solidifies into a solid (non-powder) form to form a portion of the part being printed. The 3D printer in the illustrated implementation also has a photodiode sensor 336 near the laser delivery point on the powder bed. The photodiode sensor 336 is configured to sense light intensity (as an indicator of heat energy being delivered into the powder bed by the heat source 334 at each point in time). To be more exact, in a typical implementation, the photodiode sensor includes combined effect of energy delivered in, material absorption rate, conduction, radiation, gas flow, light reflections etc.

Figure 4:
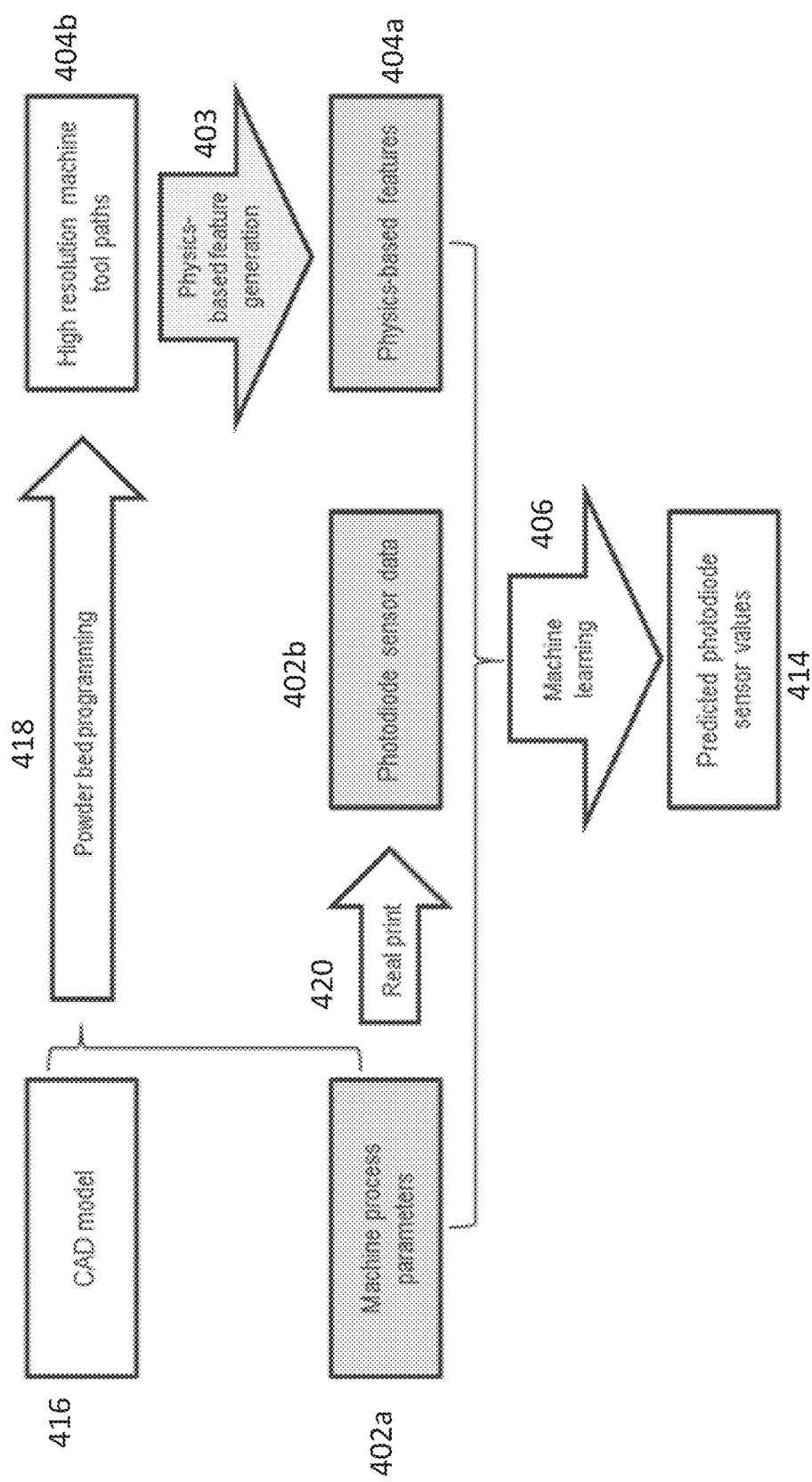
FIG. 4 is a schematic representation of an implementation of the method represented in FIG. 2 particular to the 3D printing context.

FIG. 4 is a schematic representation of an implementation of the method represented in FIG. 2 particular to the 3D printing context. Although specific to the 3D printing context, the method represented in FIG. 4 is easily applied to a variety of applications that might benefit from fast training and fast predictions.

The method represented in FIG. 4 includes leveraging both real data (in the form of machine process parameters 402a and photodiode sensor data 402b) and virtual data to train the machine-learning software model 406 to be able to predict (at 414) real world behavior of the photodiode sensor 336. The virtual data in the illustrated implementations includes physics-based features 404a that represent the energy being introduced to the part being printed within a particular window in time, and the system's ability to dissipate the energy being introduced via thermal conduction. There are a number of possible ways to generate (at 403) these physics-based features. In a typical implementation, the physics-based features are generated (at 403) by software executing on a computer-based processor and can be based on any one or more of a variety of inputs. These inputs can include, for example, the 3D printer's machine process parameters 402a and/or information from high resolution machine tool paths 404b. The machine tool paths 404b in the illustrated implementation are generated by the Powder Bed Fabrication simulator 418 based on a CAD model 416 of the part to be built.

Figure 5:
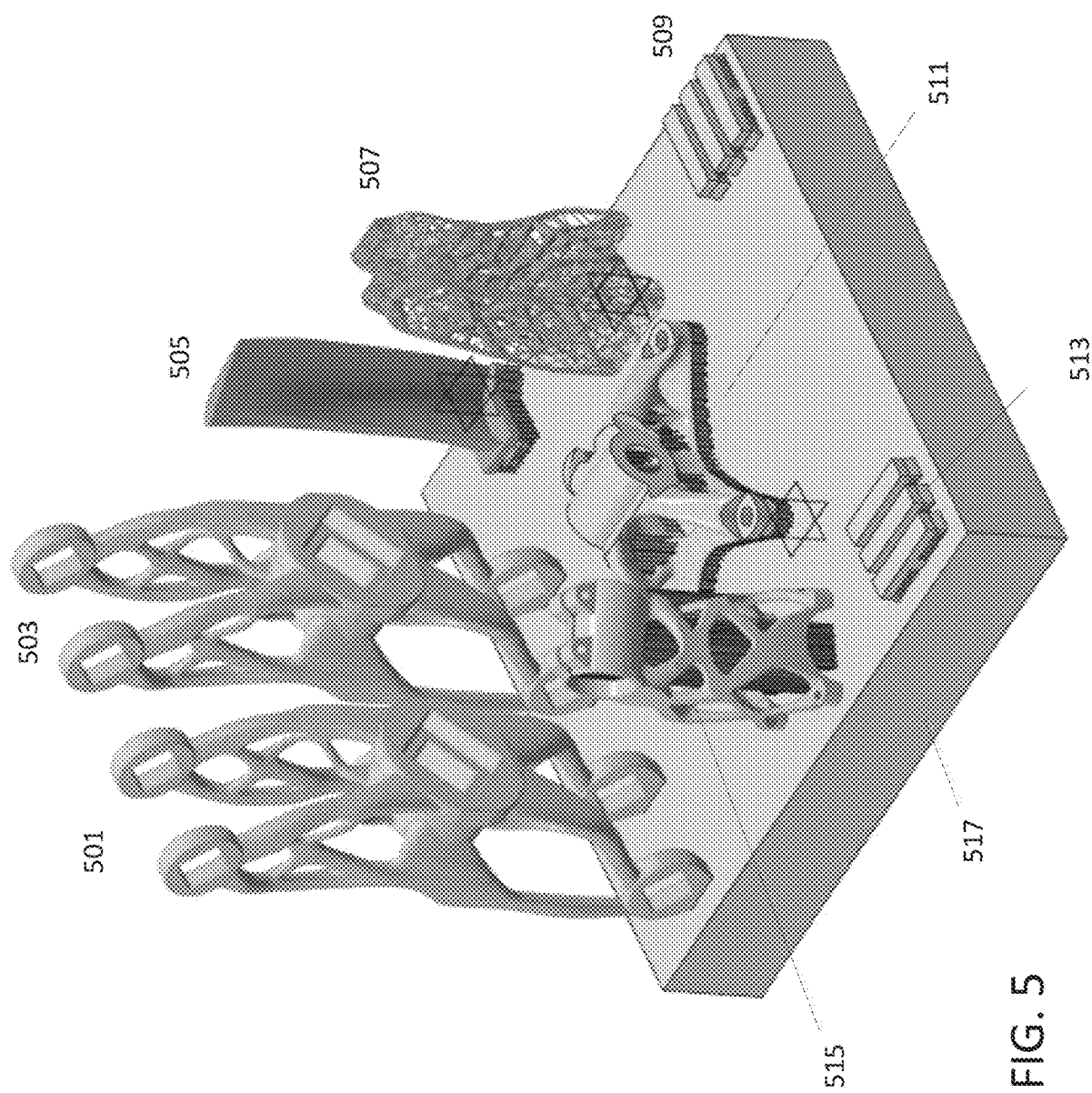
FIG. 5 shows several examples of computer-aided design (CAD) models with different geometries.

Thus, the process represented in FIG. 4 includes generating the CAD model 416 of some geometry (e.g., part) to be printed by a 3D printer. FIG. 5 shows several examples of CAD models 501, 503, 505, 507, 509, 511, 513, and 515 with different geometries that might be represented in the CAD model. These geometries are shown in the figure atop a virtual build platform 517 of a 3D printer.

The process represented in FIG. 4 includes determining machine process parameters (at 402a) for the 3D printer to build the part.

There are a variety of ways that the machine process parameters 402a can be determined. In some implementations, technician will look at the part geometry and use one set of machine parameters (e.g., a uniform laser power for the laser hatch scans, distance between hatch scans, etc.) for the entire part based on experience. The technician may then enter the parameters into a real machine (i.e., a real 3D printer) or a virtual machine (i.e., a virtual simulation of the 3D printer/photodiode sensor) in the Powder Bed Fabrication 418 application. The real machine will generate the machine controls to build the part accordingly or the virtual machine will generate the machine tool path for virtual print simulation. The real part that comes out of the machine is generally inspected for quality and, if necessary, the machine settings may be adjusted based on the inspection and the part may be printed again. This trial and error process may continue until an acceptable level of quality is reached. On the virtual side, engineers may inspect the virtual part and adjust the settings, if desired, in the Powder Bed Fabrication application 418.

Figure 6:
FIGS. 6-9 show screenshots from a Powder Bed Fabrication application which is part of the 3DEXPERIENCE® software platform available from Dassault Systèmes SE.
Figure 7:
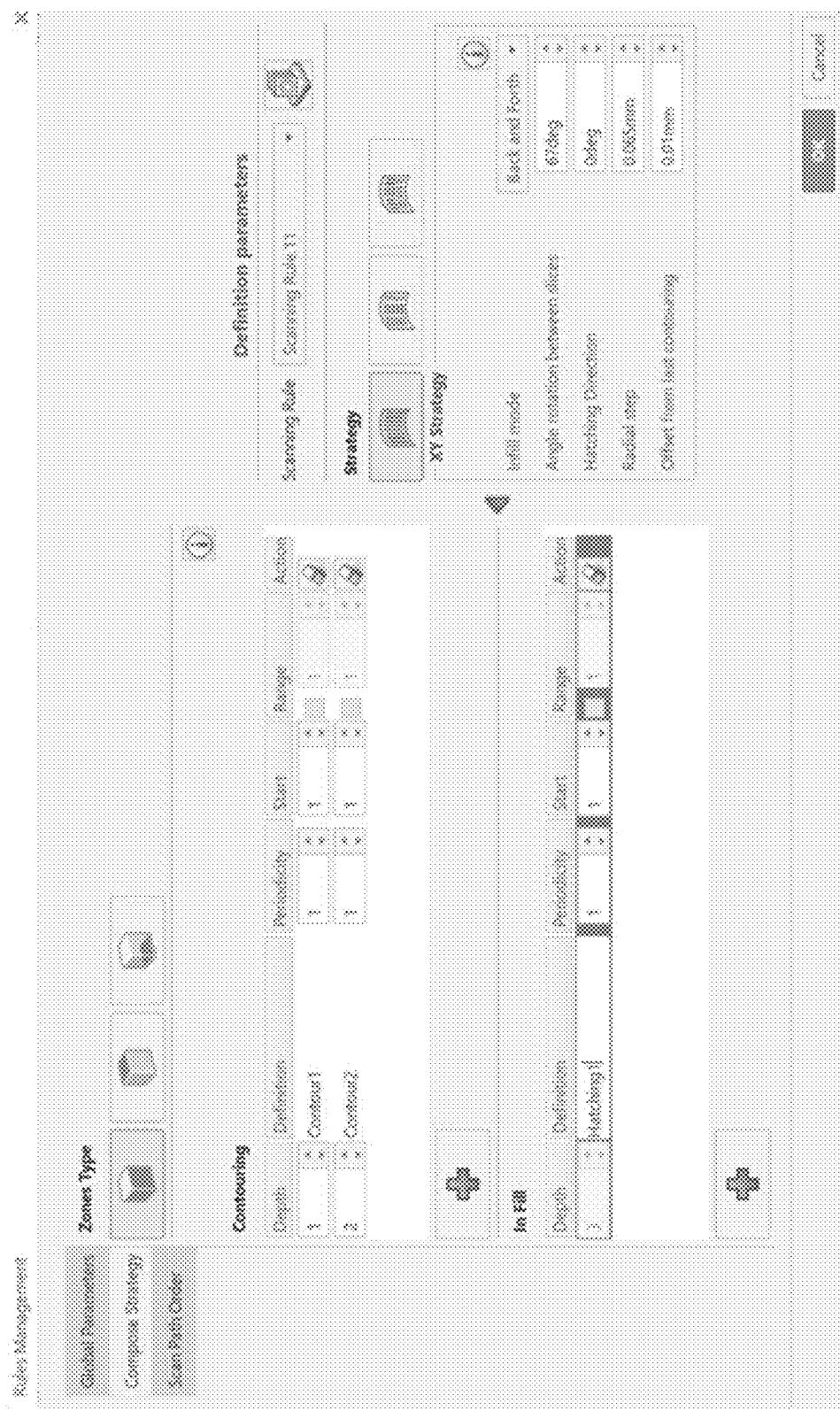

FIGS. 6 and 7 show screenshots from the Powder Bed Fabrication application (418) that enables a user to enter various machine process parameters for a particular printing process.

More specifically, the illustrated screenshots enable a user to specify global parameters for the printing process (in FIG. 6), compose a strategy (in FIG. 7), and identify a scan path order (not shown in a separate figure).

The global parameters page in the screenshot of FIG. 6 enables the user to specify or enter a name for a scan path rule and to identify a slicing step (in millimeters) for the print. The screenshot enables the user to specify upskin information including a minimal skin width, number of layers, and to restrict core by upskin. Likewise, the screenshot enables the user to specify downskin information including a minimal skin width, number of layers, and to restrict core by downskin.

The compose a strategy page in the screenshot of FIG. 7 enables the user to specify zone types, contouring information, in fill information, definition parameters and strategy information including XY strategy information. The contouring information includes depths, definitions, periodicity, start, range, and action information. The infill information includes depth, definition, periodicity, start, range, and action information. The definition parameters include a scanning rule. The strategy information includes an infill mode, an angle rotation between slices, a hatching direction, a radial step, and an offset from last contouring.

A scan path order page typically includes a list of created definitions for a scan path order (e.g., contouring, hatching, etc.).

Figure 8:
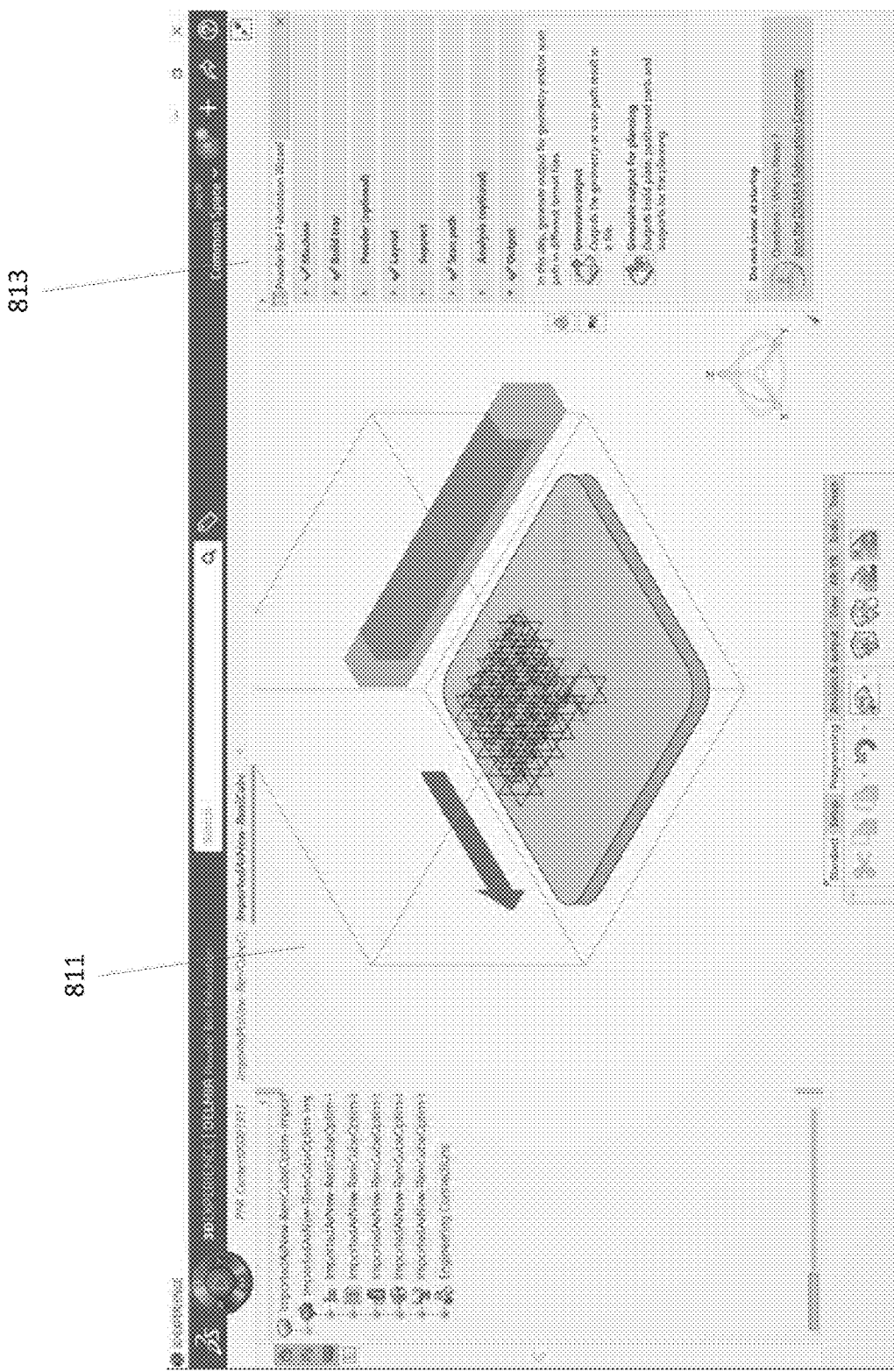
Figure 9:
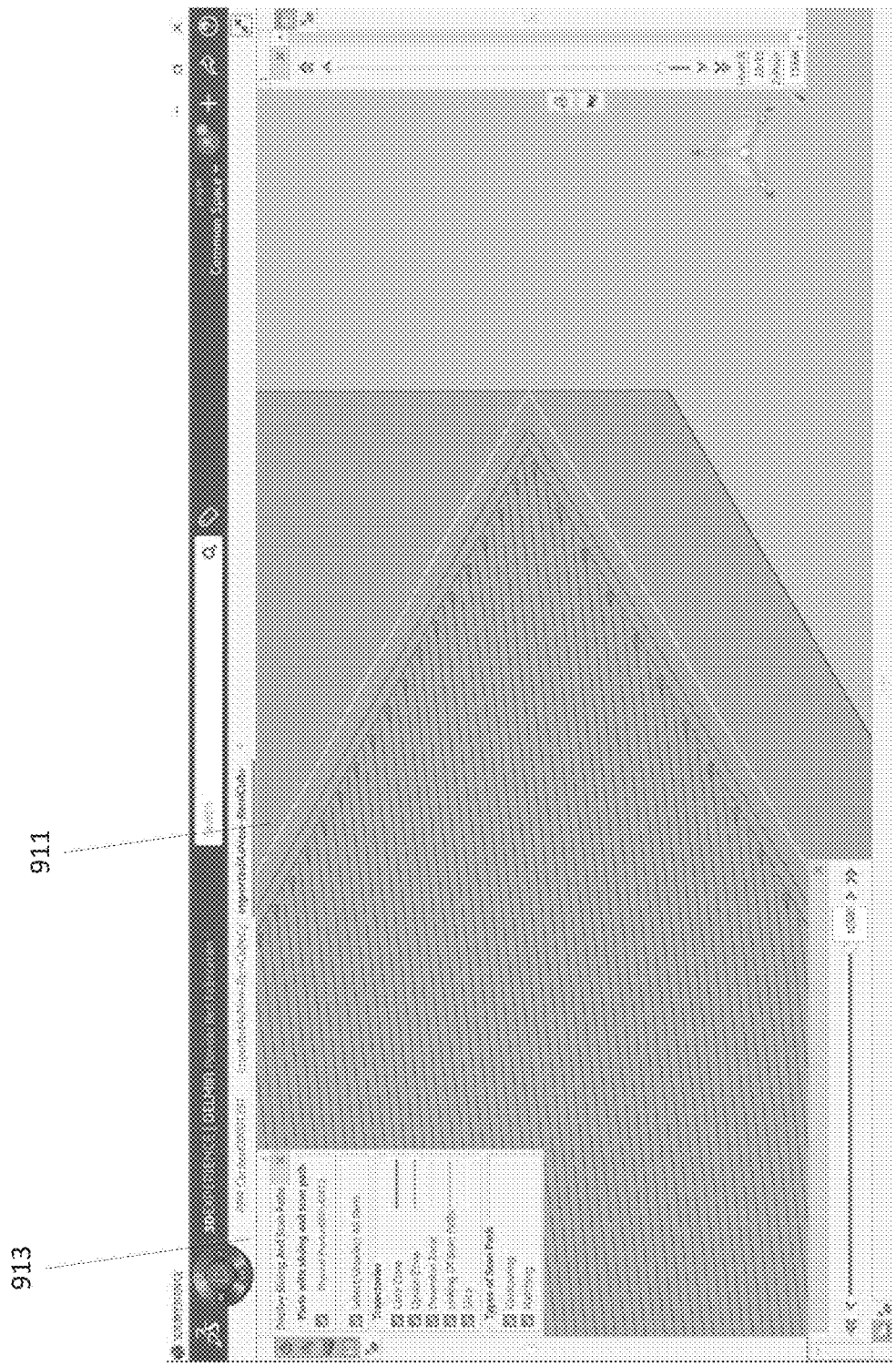

Referring again to FIG. 4, based on the information provided (based on the CAD model and/or machine process parameters); the Powder Bed Fabrication application (at 418) in FIG. 4 generates high resolution machine tool paths 404b. An example of this high resolution machine tool paths 404b information generated by the Powder Bed Fabrication application (at 418) is shown in FIGS. 8 and 9, which are exemplary screenshots produced by the Powder Bed Fabrication application 418 showing information about a detailed tool/machine paths 404b generated by the application 418 for an array of cubic parts on a build platform. Arrows and lines in these screenshots represent laser head travel directions and paths.

The screenshot in FIG. 8 includes an image field 811 with a three dimensional visual representation of a laser scan path to print a part. The screenshot in FIG. 8 also includes a first user menu 813 at the right side of the screen that provides user access to Powder Bed Fabrication Wizard functionalities including functionalities relating to a machine, a build tray, powder, layout, support, scan path, analysis, and output. A second user menu 815 appears at the bottom of the screenshot and provides user access to Powder Fabrication functionalities including standard, setup, programming, analysis & output, view, AR-VR, tools, and touch.

The screenshot in FIG. 9 includes an image field 911 with a three dimensional visual representation showing part of a laser scan path to print a part. The screenshot in FIG. 9 also includes a user menu 913 at the left side of the screen that provides user access to various Powder Bed Fabrication functionalities relating to displaying slicing and scan paths, trajectories, and types of scan paths.

In general, information that can be accessed from the high resolution machine tool paths 414 (e.g., in the Powder Bed Fabrication application environment) includes information about machine tool paths for the part represented by the CAD model 416. This information generally includes laser power information, laser speed information, and laser pattern information. In an exemplary implementation, high resolution tool path contains time and spatial information of the laser path, pattern and status. In this regard, tool path segments may look like this:

<time1>, <x1>, <y1>, <z1>, <power1>
<time2>, <x2>, <y2>, <z2>, <power2>
<time3>, <x3>, <y3>, <z3>, <power2>

This tool path segment information indicates that the laser should travel from point1 at x1, y1, z1 coordinates at time1 to point2 at x2, y2, z2 coordinates at time2 with a constant speed that equals the distance between point 1 and point 2 divided by the difference in time1 and time2 at a constant power that equals to power1. The laser then travels from point2 at x2, y2, z2 coordinates at time2 to point3 at x3, y3, z3 coordinates at time3 with a constant speed that equals the distance between point 2 and point 3 divided by the difference in time2 and time3 at a constant power that equals to power2, and so on.

The illustrated method also includes performing one or more real world prints (at 420) of the part, which results in real world photodiode sensor data 402b. Thus, the photodiode sensor data 402b is produced by one or more real machines during one or more real printing processes. In some implementations, to start the machine learning process, some parts are programmed using a variety of machine process parameters 402a and printed first to generate an initial set of photodiode sensor data 402b for training purpose. The data format will depend on specific machine and sensor, but, in a typical implementation, will at least include time, spatial location and sensor magnitude information. The amount of data generally depends on part size, machine parameters and sensor output frequency.

The physics-based features 403, in the illustrated implementation, are calculated based on information from the high resolution machine tool paths 404b.

As indicated above, the high resolution machine tool paths 404b specify laser position at different times, laser power at those different times, and laser speeds between those times. Moreover, in a typical implementation, a zone of interest surrounding the laser position will have been specified—either by a user or as a process pre-setting—and stored in computer-based memory. The size and shape of the zone of interest can vary depending on different applications. However, in a typical implementation, the zone of interest will be a circular zone on the upper surface of the powder bed/part being printed that has the same dimensions as the portion of the powder bed/part being printed that the photodiode sensor is configured to sense (+/−10%). So, if the photodiode sensor is configured to sense a circular zone having a 4 millimeter diameter, then the zone of interest may be circular with a 4 millimeter diameter (+/−10%) also. The zone of interest moves with and typically concentrically surrounds the laser position on the surface of the powder bed or part being printed at every point in the printing process.

Based on the foregoing information, a computer-based processor, for example, can determine how much energy is delivered by the laser and into the upper surface of the powder bed and part being printed and precisely where that energy is delivered for any location and for any period of time during a printing process.

In a typical implementation, the computer-based processor calculates an energy flux feature that represents how much energy has been delivered by the laser into the zone of interest surrounding the laser location during a particular period of time. The period of time can include any part or all of the printing process and may have been user-defined or set by default. The computer-based processor can calculate an energy flux feature by integrating laser power/energy data delivered into the zone of interest over the particular period of time. The computer-based processor may update its energy flux feature calculations periodically throughout the printing process or almost continually and/or in near real time.

In a typical implementation, the computer-based processor also calculates an effective conduction feature, which provides a measure of the powder bed and/or part's ability to dissipate the energy being delivered by the laser at a particular point in time. In an exemplary implementation, the computer-based processor calculates this effective conduction feature by calculating an area (e.g., in square millimeters) within the zone of interest that has not been scanned by the laser within the particular period of time. The computer-based processor may update its effective conduction feature calculations to coincide with updates in its energy flux feature calculations. Thus, they may be updated periodically throughout the printing process or almost continually and/or in near real time.

Figure 10:
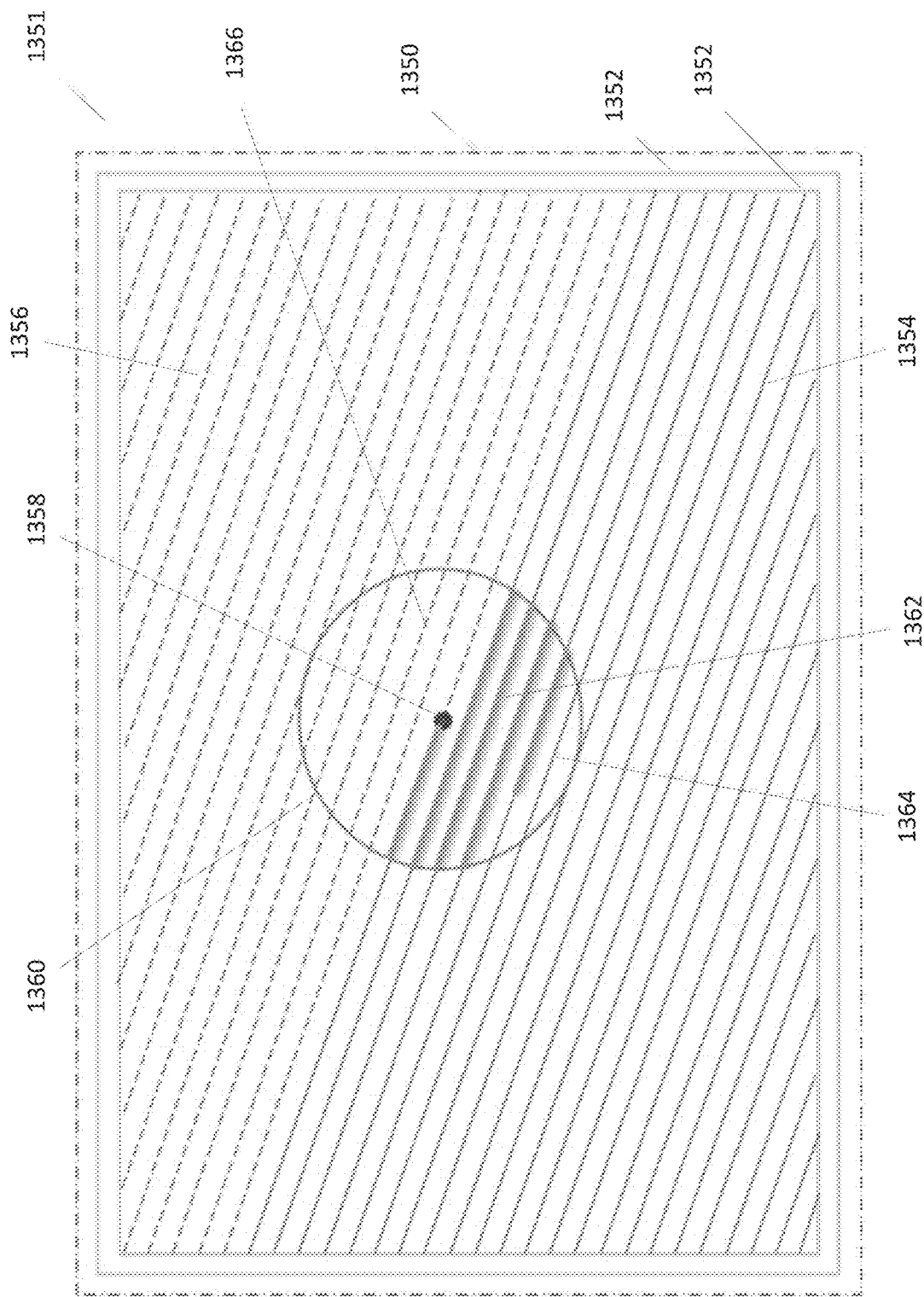
FIG. 10 is a schematic representation showing a top view of a powder bed, where a part is being printed, in a 3D printer and a path that the laser tool will follow across the upper surface of the powder bed in a rectangular print layer.
Figure 11:
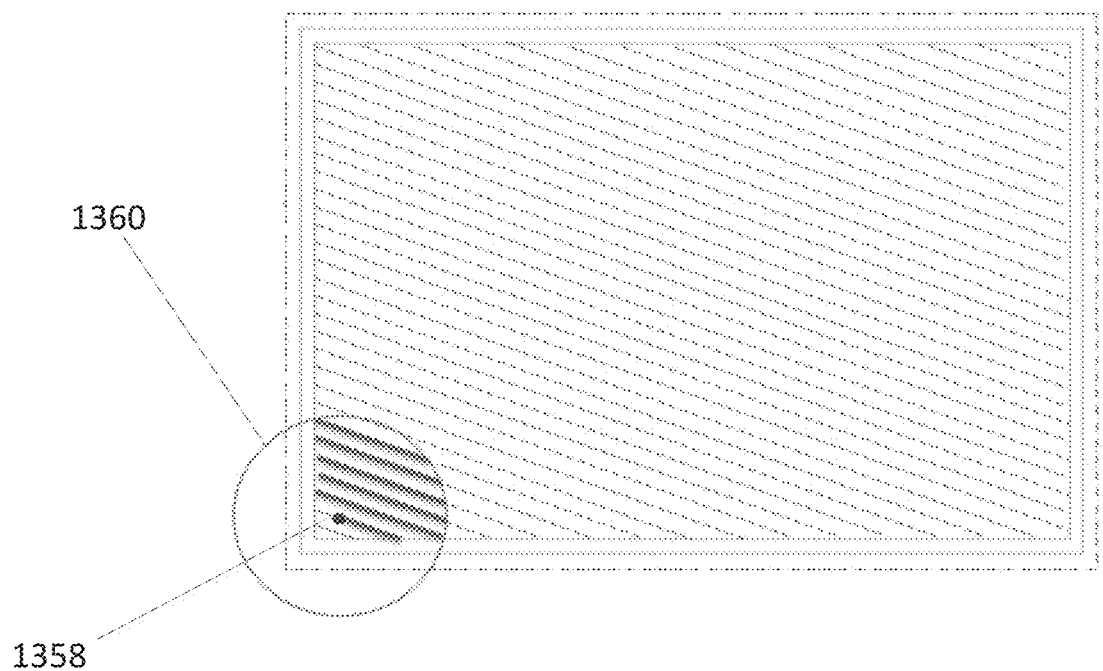
FIGS. 11 and 12 are schematic representations of the powder bed from FIG. 10, showing a laser position and a zone of interest circle at near the start of the scanning process (in FIG. 11) and near the end of the scanning process (in FIG. 12).
Figure 12:
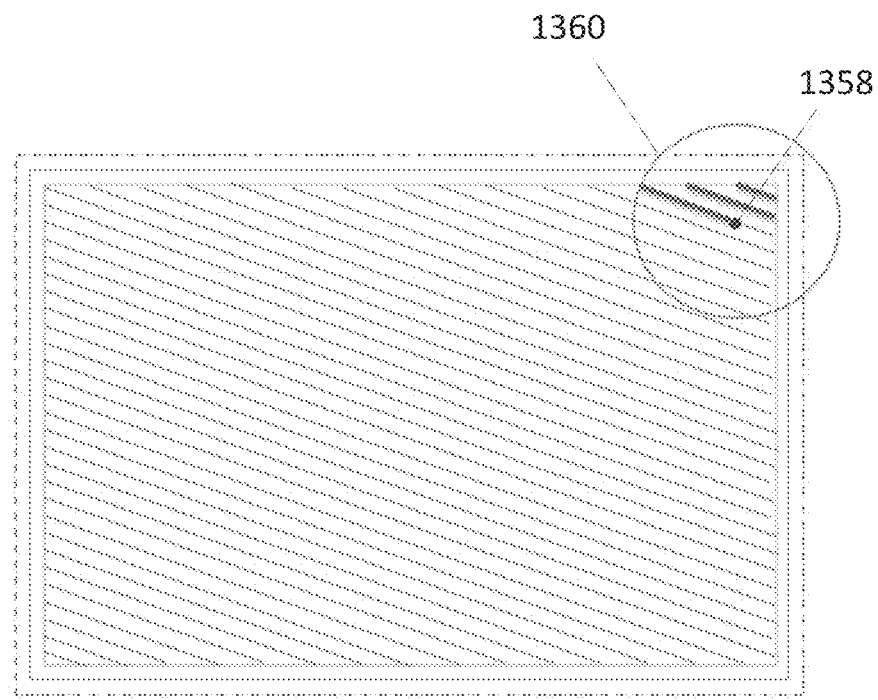

The concepts of energy flux and effective conduction in the context of physics-based feature calculation can be further understood by referring to FIGS. 10-12, for example.

FIG. 10 is a schematic representation showing a top view of a powder bed 1351, where a part is being printed, in a 3D printer (e.g., 3D printer 322 in FIG. 3) and a path that the laser tool will follow across the upper surface of the powder bed in a rectangular print layer.

The external rectangle 1350, shown as a dot-dash line, represents a border of the part at the current layer. The two solid rectangles 1352 inside the dot-dash line represent two contouring laser paths. The solid and dash lines inside the contouring border represent the infill laser tool paths. The solid lines 1354 inside the contouring border represent areas that the laser already has scanned as of a particular point in time, and the dashed lines 1356 inside the contouring border represent areas that the laser has not scanned yet as of the particular point in time. The dot 1358 near the center represents a laser position at a particular point in time during the laser scanning process. The circle 1360 around the black dot represents a zone of interest for calculating the physics-based features 404a (e.g., an energy flux feature and an effective conduction feature). This zone of interest is essentially the area of the powder bed/part being printed that is considered relevant for purposes of calculating the aforementioned physics-based features.

In a typical implementation, the border of the part at the current layer (outer dot-dash line 1350) may be based on the dimensions of the part being printed and/or the size of the powder bed 328. The two contouring laser paths (solid rectangular lines 1352), and the infill laser tool paths (solid and dashed lines 1354, 1356 inside the contouring border) are functions of the high resolution machine tool paths 404b. In some implementations, the zone of interest 1360 is the same size and shape as the area on the upper surface of the powder bed 328 that the photodiode sensor 336 is configured to sense (+/−10%). In one exemplary implementation, the photodiode sensor 336 is configured to sense a circular area on the upper surface of the powder bed 328/part being printed that is about 4 millimeters in diameter. In those implementations, the circle identifying the zone of interest may be set to a diameter of about 4 millimeters+/−10%. It is possible that in some implementations the size of the circle may vary depending on one or more factors (e.g., speed of the laser 334 across the powder bed 328, etc.). It is also possible, in some implementations that the size of the circle may be specifiable by a user (e.g., at a computer-based interface allowing the user to interact with the physics-based feature generation process). In a typical implementation, the zone of interest circle moves across the powder bed surface as the laser moves across the powder bed surface so that the laser position dot 1358 moving across the powder bed surface remains centered at all times within the zone of interest circle 1360.

The thicker solid lines 1362 within the zone of interest circle 1360 represent those areas in the zone of interest circle 1360 that have been laser scanned already within a particular period of time. These thicker solid lines 1362 identify areas within the zone of interest circle 1360 that are considered relevant for purposes of calculating an energy flux feature that corresponds to the laser position indicated by the dot 1358.

Narrower solid lines 1364 within the zone of interest circle 1360 identify areas that have been scanned by the laser already, but that are considered not relevant for purposes of calculating the energy flux feature for the indicated laser position 1358. One reason why the areas identified by the narrower solid lines might be considered not relevant in this regard might be that those scans happened outside the particular period of time considered relevant for the energy flux calculation. In essence, if enough time passes after a particular area is laser scanned, the energy dissipates from that area enough that it can be ignored for purposes of calculating the energy flux feature.

Dashed lines 1366 within the zone of interest circle 1360 identify areas that have not yet been scanned by the laser. These areas (identified by dashed lines 1366) area considered not relevant for purposes of calculating the energy flux feature for the indicated laser position 1358. They are considered not relevant for the energy flux feature calculation because laser energy has not yet been delivered to those areas. They are, however, considered relevant to calculating the effective conduction feature. They are considered relevant to calculating the effective conduction feature because they have not yet received a direct delivery of laser energy. As such, these areas 1366 are considerably cooler than the recently scanned area 1362 and, therefore, provide an escape path for heat/energy from area 1362 via thermal conduction. In some implementations, area 1364 may also be included in the effective conduction calculation because, if sufficiently cooled, that area 1364 too could provide an escape path for heat/energy from area 1362 via thermal conduction. In general, if zone 1366 (and 1364) is larger, this results in a greater ability to dissipate heat, and, in general, if zone 1366 (and 1364) is smaller, this results in a lesser ability to dissipate heat.

There are a variety of ways in which the computer-based processor might calculate the effective conduction feature. In one such example, the computer-based processor subtracts the area of zone 1362 from the area of the overall zone of interest 1360. In another such example, the computer-based processor calculates the area of zone 1366. In yet another such example, the computer-based processor adds together the area of zone 1366 and the area of zone 1364. In some implementations, these calculations can be made directly from information provided with the high resolution machine tool paths 404*b*.

FIG. 11 and FIG. 12 are schematic representations of the powder bed 1351 from FIG. 10, showing a laser position 1358 and a zone of interest circle 1360 at near the start of the scanning process (in FIG. 11) and near the end of the scanning process (in FIG. 12).

These figures help illustrate a few points. First, that the zone of interest circle 1360 moves with, and remains centered around, the laser position 1358 throughout the printing process. Second, that the physic-based feature calculations discussed above are applicable and accurate even if the laser is near a geometric boundary of the part being created. The thick lines in FIG. 11 represent the integration paths to compute the un-scanned area, which is relatively a large portion of the zone of interest (i.e., a characteristic dimension local patch). The thick lines in FIG. 12 represent the integration paths to compute the un-scanned area, which is relatively a small portion of the circle. The physics-based features (i.e., the energy flux features and effective conduction features), therefore, automatically incorporate the geometric boundary effect, eliminating the need to design geometric features into the machine learning process which could be extremely complex and difficult.

Various other techniques or approaches may be possible for calculating the physics-based features. Generally speaking, however, these physics-based features 404*a* can be calculated quickly and easily, even without extensive simulation or modeling. Moreover, their impact on making the machine-learning software model 406 accurate in predicting photodiode sensor 406*b* behavior is very high. Moreover, including the physics-based features 404*a* in the training process for the machine-learning software model 406 has been found to make the machine-learning software model 406 better able to predict the behavior of a photodiode sensor in other processes/machines. Additionally, these methods can be implemented and adopted easily given access to detailed tool path information (e.g., from virtual machine data available from Dassault Systemes' 3DEXPERIENCE® platform), and due to their relative simplicity and efficiency of methodology, they are generally scalable to part level predictions.

Referring again to FIG. 4, the physics-based features 404*a* (i.e., the energy flux feature(s) and effective conduction feature(s)) are provided to the machine-learning software model 406, along with the machine process parameters 402*a* and the real world photodiode sensor data 402*b* to train the machine-learning software model 406 to be able to predict photodiode sensor values 414.

In some implementations, particularly those where speed of training and/or speed of prediction is of particular concern, the aforementioned physics-based features (i.e., energy flux feature and effective conduction feature) may be the only forms of virtual data used to train the machine-learning software model 406. In those instances, all the rest of the training data provided to the machine-learning software model 406 may be real data (e.g., 3D printer machine process parameters 402*a* and/or real photodiode sensor data 402*b*). In some implementations, particularly where available time is not strictly limited, it may be desirable to supplement the training with additional virtual data as well.

It has been found that the phenomena represented by these particular physics-based features (i.e., energy flux feature and effective conduction feature) can be generated very quickly, and are very effective at training the machine-learning software model 406 to accurately predict behavior of the photodiode sensor 336 under various operating conditions. Moreover, a high degree of accuracy can be obtained even if these are the only types of virtual data used in the training process, and all the other training data is real data.

Once trained, according to the illustrated implementation, the machine-learning software model 406 is able to predict (at 414) the behavior of the real photodiode sensor.

Figure 14:
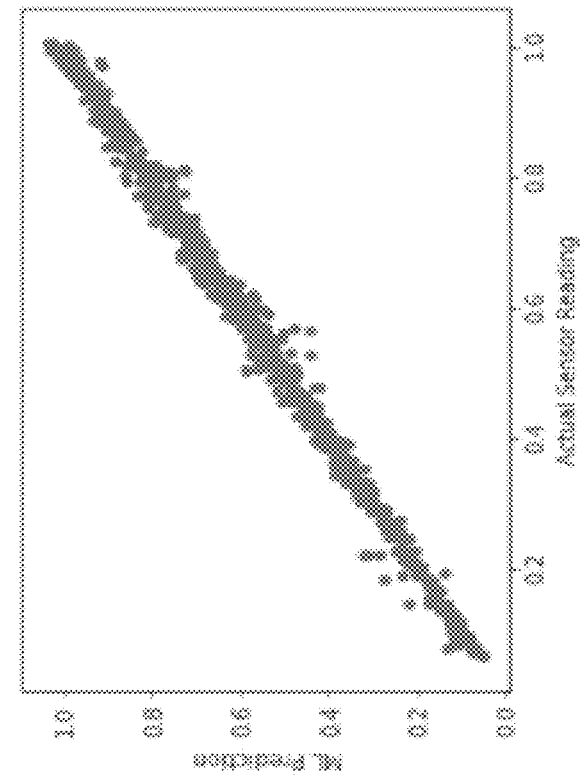
FIG. 14 shows a single layer test data prediction scattered plot with physics-based features having been included in the training process.
Figure 13:
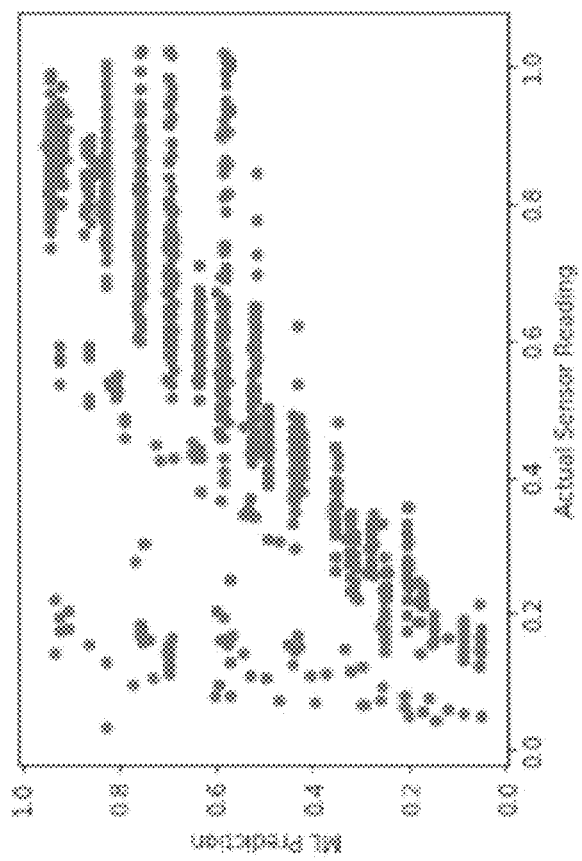
FIG. 13 shows a single layer test data prediction scattered plot without physics-based features having been included in the training process.

It has been discovered that training a machine-learning software model with physics-based features (in addition to real data) can produce much more accurate sensor predictions than training the machine-learning software model with real data only. In this regard, FIG. 13 shows a single layer test data prediction scattered plot based on machine process parameters and photodiode sensor data alone, and FIG. 14 shows a single layer test data prediction scattered plot based on machine process parameters, photodiode sensor data, physics-based features, and a CAD model. These figures show considerable improvement in precision when the physics-based features and CAD model are included.

A trained machine learning software model can be subsequently used to provide fast predictions of the physical sensor data for any given part to guide the machine operator to come up with better machine settings; or be used for optimization of machine parameters for a targeted sensor signal all over the part, thus enabling less trial and errors to achieve a right print. For example, based on an initial setting of machine process parameters for a given CAD geometry, the foregoing methods can be used to generate the physics-based features and combined with the real data (e.g., initial machine process parameters) to train a machine-learning software model to predict sensor readings for an entire part. Then a sensitivity based optimization method can be used, for example, to come up with optimum machine process parameters iteratively including an optimum 3d laser power or laser speed field all over the part.

Figure 15:
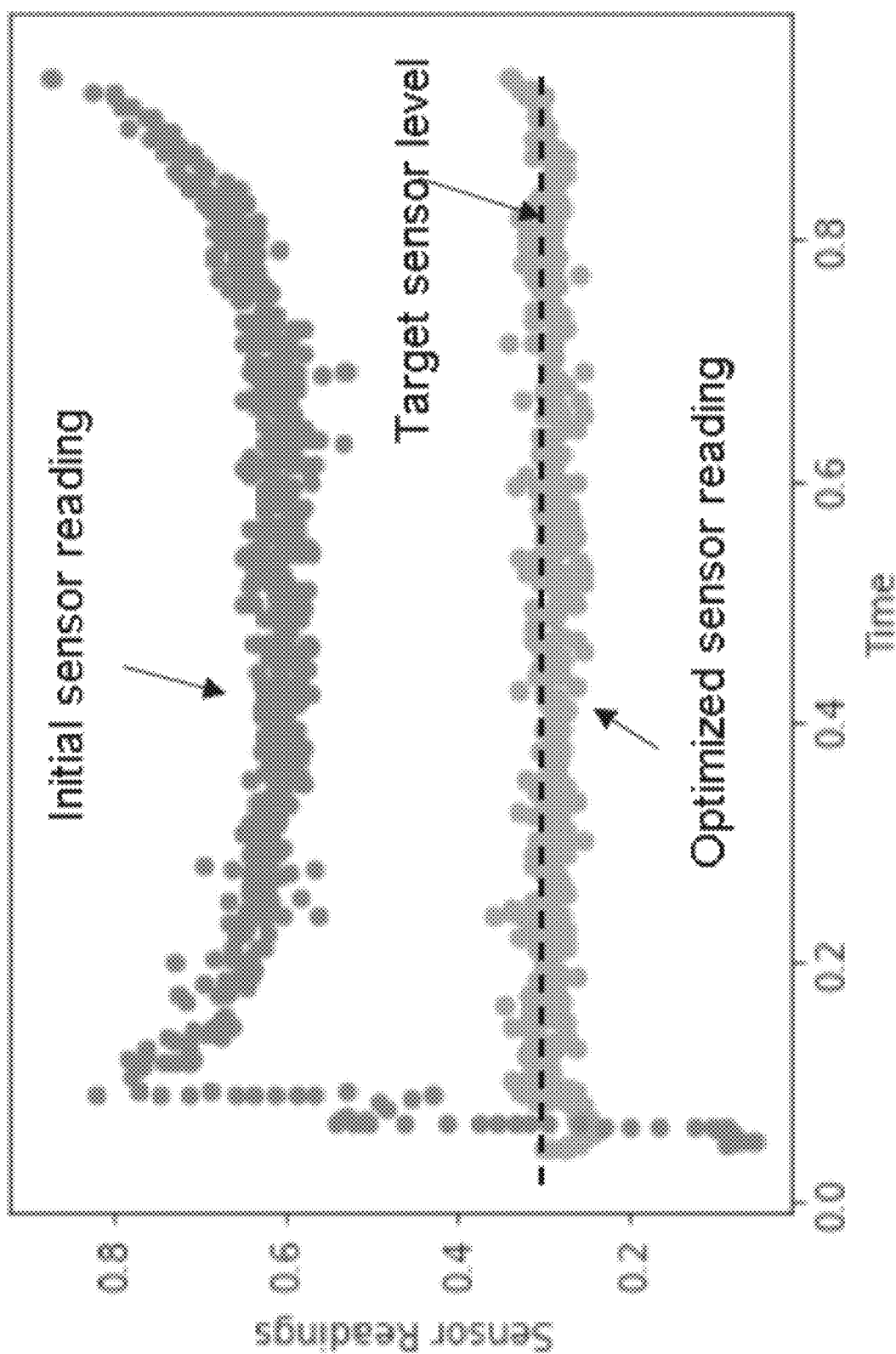
FIG. 15 shows an experimental validation of photodiode sensor readings for a single layer before and after a print optimization process.

FIG. 15 shows an experimental validation of photodiode sensor readings for a single layer before and after a print optimization process that relies on this sort of approach. The old photodiode sensor readings with initial machine process parameters and the new photodiode sensor readings with optimized machine process parameters are both labeled. It is shown that with the print optimization, the photodiode sensors can be optimized to be very close to a target level preventing the part from over- or under-heating during the print process and significantly reducing the need for trial and errors to achieve a successful build.

Figure 16:
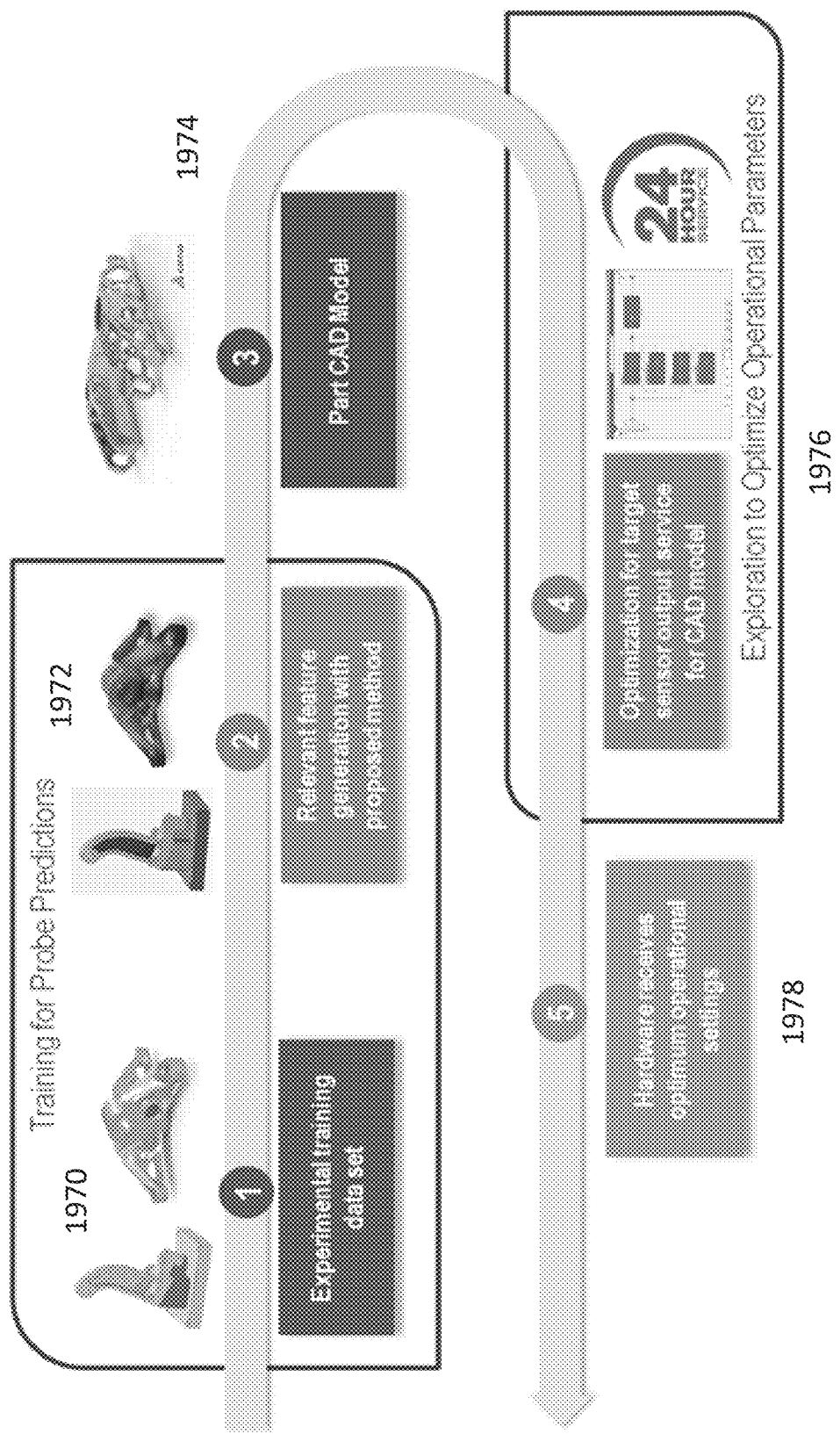
FIG. 16 is a schematic representation showing an exemplary flow of a machine learning and print optimization framework.

FIG. 16 is a schematic representation showing an exemplary flow of a machine learning and print optimization framework. First, in the illustrated implementation, training data sets are defined (at 1970). Physical experiments are performed to record machine settings and sensor data. Relevant physics-based features are created (at 1972) with the proposed methodology for these parts. The data is then used to train a predictive machine learning software model. Given a new part CAD model (1974) and machine operating restriction, the machine settings are then optimized (at 1976) for targeted sensor output. Machine readable file formats are generated and sent to the hardware (at 1978) for printing for the first time with targeted part quality. The machine learning software model can keep being trained as more parts are printed and data added as additional training data and the machine learning model accuracy improves as more parts are printed.

Figure 17:
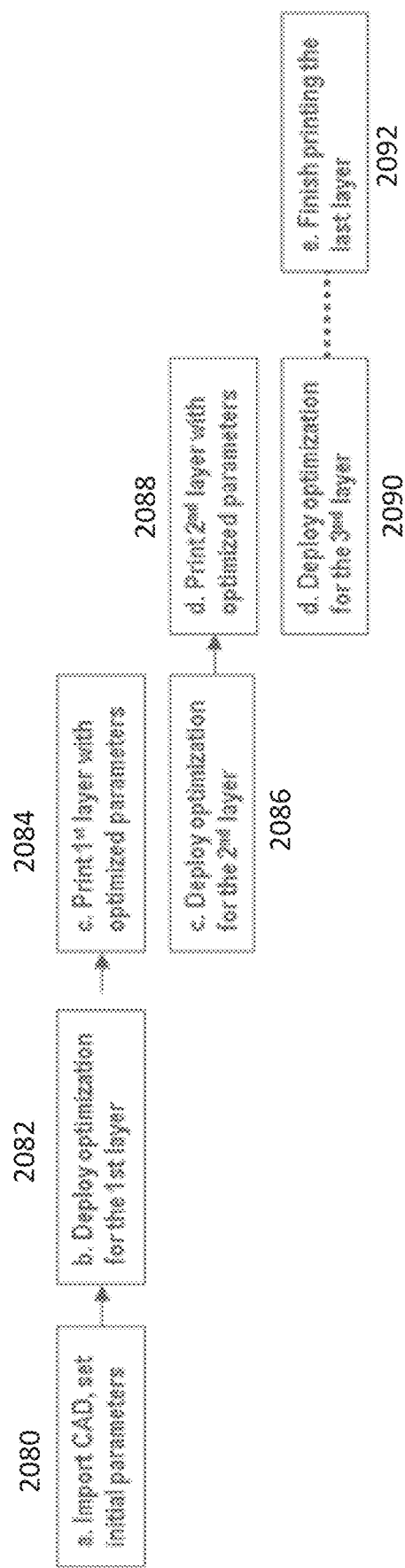
FIG. 17 is a schematic representation of a process for making sensor predictions and optimizing machine parameters on a layer-by-layer basis and in real-time in an additive manufacturing context.

Once a machine learning software model has been trained, the trained machine learning software model, physics-based feature generation and optimization method can then be employed in connection with one or more additive manufacturing machines to make sensor predictions and optimize machine parameters on a layer-by-layer basis and in real-time. FIG. 17 shows an exemplary implementation of just such a process.

The process represented in FIG. 17 includes importing a CAD model to the machine and setting initial machine parameters (at 2080) and deploying optimization for the first layer (at 2082). Typically, optimization is done for the first print layer according to machine learning predictions using the machine parameter and physics based feature generated. Then (at 2084), the machine prints the first layer using the optimized parameters. At the same time in the build, the system deploys optimization for the second layer (at 2086). Then (at 2088), the machine prints the second layer using an optimized parameters. At the same time during the build, the system deploys optimization for the third layer (at 2090). This continues until the last layer and build is finished (at 2092).

Figure 18:
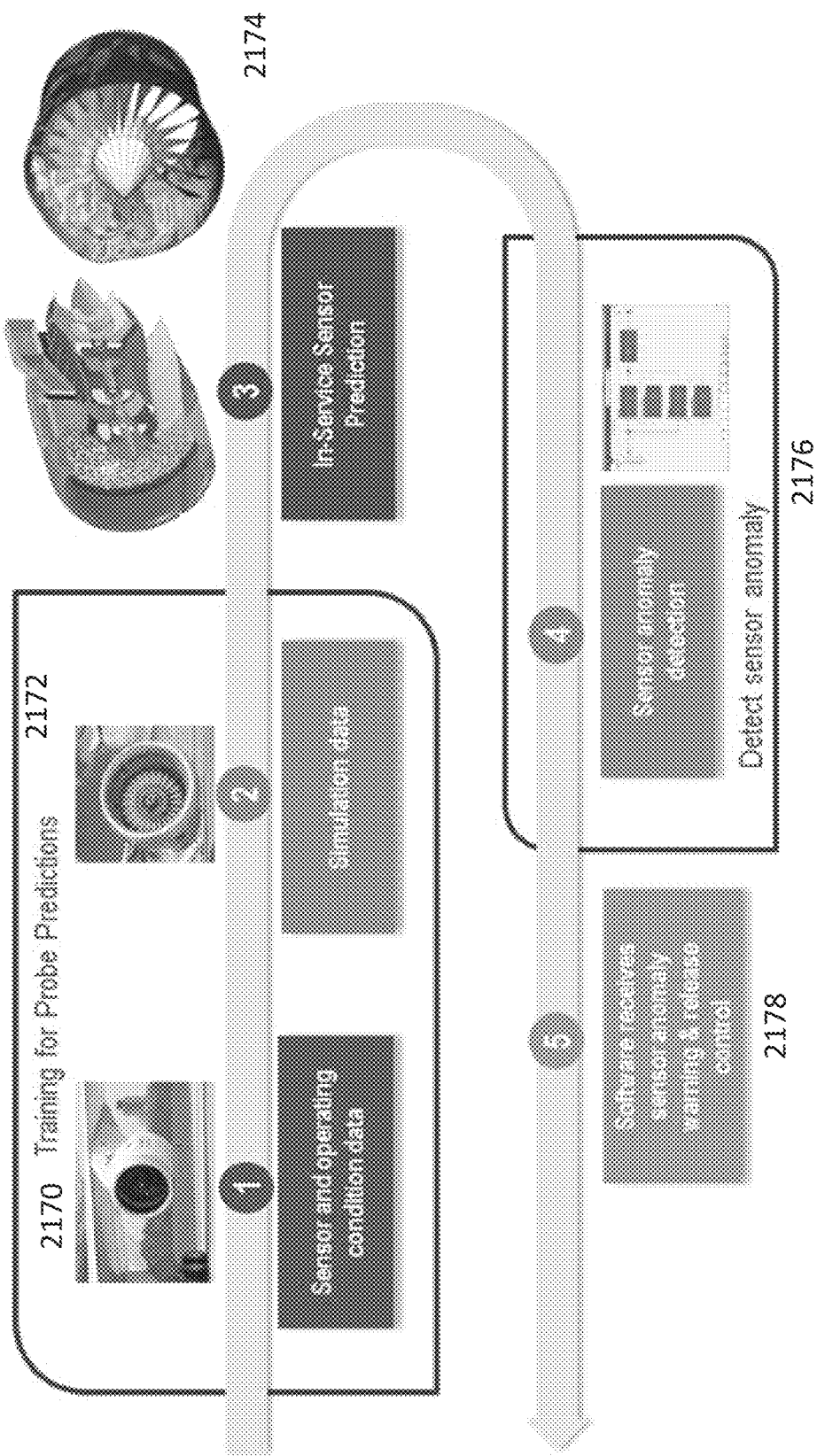
FIG. 18 is a schematic representation showing an exemplary flow of sensor anomaly detection.

FIG. 18 is similar in many ways to the schematic representation shown in FIG. 16. In FIG. 18, first, sensor and operating condition data is defined (at 2170). Physical experiments are performed to record machine settings and sensor data. Simulation data is created (at 2172). The data is then used to train a predictive machine-learning software model. The machine-learning software model is then used to make in-service sensor predictions (at 2174). Next, the system determines (at 2176) whether there is a sensor anomaly (i.e., whether an actual sensor reading departs a sufficient amount from a predicted sensor reading). In a typical implementation, the system (e.g., a computer-based processor in the system) might receive an actual sensor reading, compare that actual sensor reading to a corresponding predicted sensor reading and then, if the difference between the two exceeds some threshold (e.g., 1%, 5%, 10%, etc.), a warning is issued (at 2178). In some implementations, the threshold may be definable by a user. In some implementations, the threshold may be a pre-set threshold. The warning may take any one of a variety of different forms including, for example, a message to the operator, with audible visual or tactile elements, etc. In some implementations, the warning might be accompanied by a suspension of the process. Other warnings and association actions are possible as well.

Figure 19:
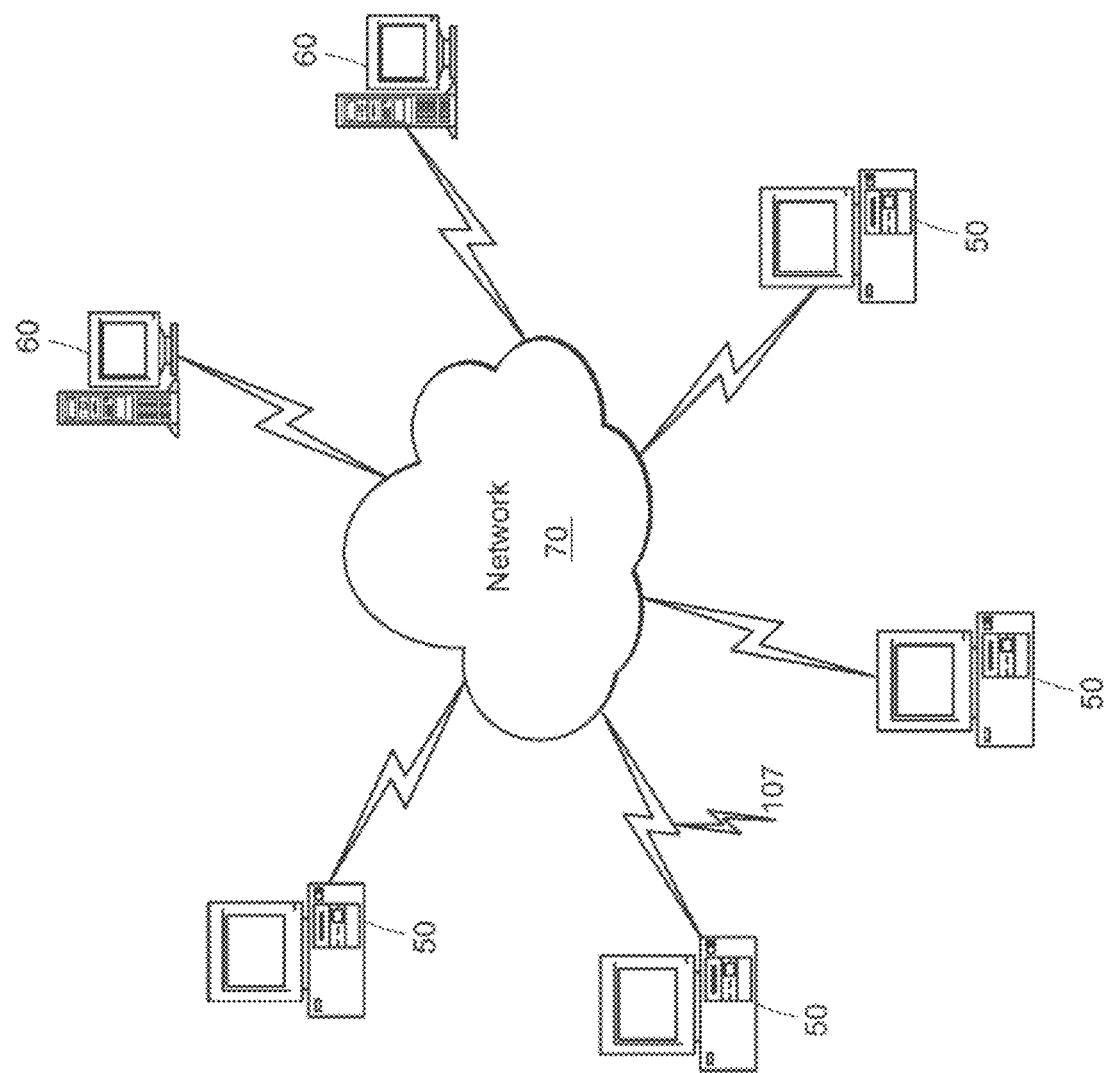
FIG. 19 is a schematic representation of a computer network or similar digital processing environment.

FIG. 19 illustrates a computer network or similar digital processing environment in which embodiments of the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 20:
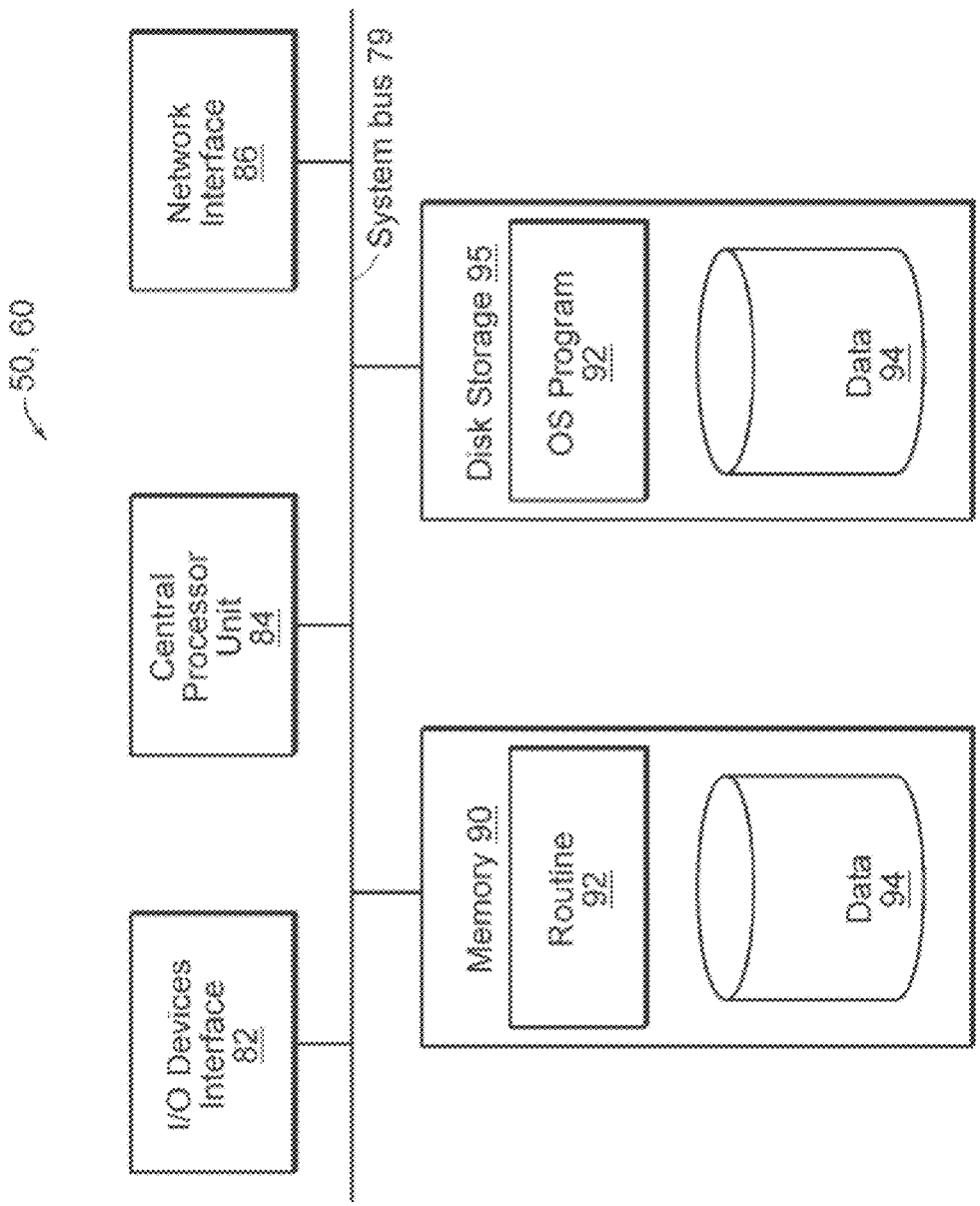
FIG. 20 is a schematic representation of an exemplary computer in the computer network or similar digital processing environment of FIG. 19.

FIG. 20 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., code detailed above in FIGS. 1 and 2). Memory can include any combination of one or more computer-based memory storage devices that may be local to one another or distributed. Disk storage 95 provides non-volatile storage for computer software instructions 92 and data 94 used to implement an embodiment of the present invention. Central processor unit 84 is also attached to system bus 79 and provides for the execution of computer instructions. In a typical implementation, the techniques disclosed herein as being performed by a computer-based processor or the like can be performed by CPU 84, or some combination of processors, which may be local to one another or distributed.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92. In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as so called Software as a Service (SaaS), or other installation or communication supporting end-users.

Compared to using purely experimental data, virtual simulation data may provide much more physical information about a system. For example, simulation informs about the temperature not only at the sensor install location but everywhere in the system; sensors are subjected to device operation restrictions, e.g., could be limited by gauging range or blocked by operating parts, while simulation data is always accessible; simulation provides extra physical quantities, e.g., thermal radiation, stress, strain and etc., that cannot be practically measured experimentally but are crucial to predict the system outcome. This invention proposes a machine learning service based on both virtual simulation and real (V+R) data. Simulation data includes high fidelity physical simulation models (including but not restricted to Finite Element modeling) and data as well as the reduced order or first order models and data that were developed from feature importance and intelligence gained from or validated by the machine learning process. Real data includes realistic parameters such as design parameters, geometry, material, manufacturing settings etc. that are known without any knowledge of modeling and simulation.

A number of embodiments of the invention have been described. Nevertheless, it will be understood that various modifications may be made without departing from the spirit and scope of the invention.

For example, the systems and methods disclosed herein can be applied to a wide range of processes including all types of manufacturing processes including additive manufacturing processes, and other non-manufacturing processes. Once trained, the machine-learning software model can be applied to a variety of different purposes within the process of interest including, for example, prediction, diagnostics, simulation, etc.

The specific combination of real and virtual data that is used in training the machine-learning software can vary considerably. In most instances, the training approach can be tailored in view of the practical considerations involved in a particular process. For example, if time is pressing, then the physics-based features disclosed herein may be the only—or almost the only—virtual data used in the training process. However, where more time is available, other forms of virtual data may be used as well. Moreover, a wide range of types of real data may be used as well.

The CAD model can be produced using virtually any kind of computer-aided drawing application and can be very detailed or not so very detailed. Likewise, the simulation can be produced using any one of a variety of different simulation applications or combinations thereof. The machine process can be a process that includes one machine or multiple machines, acting in series or parallel or a combination thereof. The sensors to be predicted can be any kind of sensor including, for example, sensors for optical, light, imaging, photon, acoustic, sound, vibration, automotive, chemical, electric current, electric potential, magnetic, radio, environmental, weather, moisture, humidity, flow, fluid velocity, ionizing radiation, subatomic particle, navigation, position, angle, displacement, distance, speed, acceleration, pressure, force, density, level, thermal, heat, temperature, proximity, presence, speed, etc.

The machine-learning software model can be any kind of machine-learning software model that is trainable and executable in a computer-based environment.

The optimization processes disclosed herein can include any kind of a procedure which is executed iteratively by comparing various solutions till an optimum or a satisfactory solution is found. The trained machine-learning software model helps facilitate optimization because it feeds immediate sensor predictions to the optimizer at every iteration reducing the overall time required to achieve a particular degree of optimization target.

The 3D printing machine disclosed herein is only one example of a 3D printing machine. Many variations are possible. The sensor discussed in particular association with the 3D printing machine is a photodiode sensor. However, other sensors are possible as well.

This application discloses the Powder Bed Fabrication application as an example of an application that can generate high resolution machine tool paths. Other tools may be able to generate machine tool paths as well.

The physics-based features that this application focuses on include an energy-flux feature and an effective conduction feature. In various implementations, other physics-based features may be calculated and used in training the machine-learning software model as well.

Moreover, while this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are disclosed herein as occurring in a particular order, this should not be understood as requiring that such operations be performed in the particular order shown or in sequential order, or that all represented operations be performed, to achieve desirable results.

Other implementations are within the scope of the claims.

What is claimed is:

1. A method comprising:
   collecting and utilizing process parameters from a real-world additive manufacturing machine, real-world sensor readings from the additive manufacturing machine manufacturing a real-world part, and physics-based features generated by a computer-based processor to train a machine-learning software model to predict a future behavior of the real-world sensor in a subsequent real-world version of an additive manufacturing process by the real-world additive manufacturing machine,
   wherein the collecting comprises:
      entering machine process parameters for an additive manufacturing process into a real-world additive manufacturing machine to produce a part via the additive manufacturing process;
      providing a real-world sensor to sense a characteristic associated with the additive manufacturing process;
      manufacturing a first real-world part with the real-world additive manufacturing machine via the additive manufacturing process;
      sensing the characteristic associated with the additive manufacturing process with the real-world sensor while the real-world machine is manufacturing the first real-world part via the additive manufacturing process;
      receiving sensor readings from the real-world sensor while the real-world machine is manufacturing the first real-world part via the additive manufacturing process; and
      generating, with a computer-based processor, physics-based features associated with the additive manufacturing process; and
   wherein the utilizing comprises:
      training a machine-learning software model based on the machine process parameters, the real-world sensor readings, and the physics-based features to predict a behavior of the real-world sensor.

2. The method of claim 1, further comprising:
   providing a computer-aided design (CAD) model of the part; and
   producing virtual data about a machine tool path for the additive manufacturing process to produce the part with computer-based software based on the CAD model, wherein generating the physics-based features is based at least in part on the virtual data about the machine tool path.

3. The method of claim 2, wherein the physics-based features represent energy delivered into and heat conducted out of a zone of interest during the additive manufacturing process.

4. The method of claim 3, wherein the zone of interest is an area on a surface of a powder bed, wherein the zone of interest is concentric with a spot where energy is being introduced into the powder bed at a particular point of time in the additive manufacturing process.

5. The method of claim 4, wherein the zone of interest moves and remains concentric with wherever energy is being introduced into the powder bed as the additive manufacturing process progresses.

6. The method of claim 2, wherein generating the physics-based features comprises:
   generating an energy flux feature,
   wherein the energy flux feature corresponds to an amount of energy delivered into a zone of interest during a particular period of time in the additive manufacturing process.

7. The method of claim 6, wherein generating the energy flux feature comprises:
   integrating, with the computer-based processor, power into the zone of interest during the particular period of time, based at least in part on the virtual data about the machine tool path.

8. The method of claim 7, wherein the virtual data about the machine tool path comprises time, location, and power information for a heat source in the additive manufacturing machine.

9. The method of claim 2, wherein generating the physics-based features comprises:
   generating an effective conduction feature,
   wherein the effective conduction feature corresponds to an ability to dissipate energy introduced into a zone of interest via thermal conduction.

10. The method of claim 9, wherein generating the effective conduction feature comprises:
    determining how much of the zone of interest does not receive a direct delivery of energy within a finite window of time based at least in part on the virtual data about the machine tool path.

11. The method of claim 10, wherein the virtual data about the machine tool path comprises time, location, and power information for a heat source in the additive manufacturing machine.

12. The method of claim 1, wherein the machine process parameters comprise power, speed, and scan pattern information associated with the additive manufacturing process.

13. The method of claim 1, further comprising:
    optimizing the process parameters using a trained version of the machine-learning software application.

14. The method of claim 13, wherein optimizing the process parameters using the trained version of the machine-learning software model comprises:
    adjusting the machine process parameters based on information from the machine-learning software model to produce a desired sensor reading at the real-world sensor during the additive manufacturing process.

15. The method of claim 1, further comprising:
    predicting a behavior of the real-world sensor during the additive manufacturing process with the machine-learning software model;

comparing the predicted behavior to an actual behavior of the real-world sensor during the additive manufacturing process; and detecting an anomaly in behavior of the real-world sensor based on the comparison.

16. The method of claim 1, wherein the additive manufacturing process is three dimensional (3D) printing and wherein the additive manufacturing machine comprises a build platform, a powder bed atop the build platform; and a heat source configured to deliver heat into a surface of the powder bed to create the part.

17. A system comprising:
a computer comprising:
   a computer-based processor; and
   a computer-based memory storing computer-executable instructions that, when executed by the computer-based processor, cause the computer-based processor to generate physics-based features associated with an additive manufacturing process;
one or more real-world additive manufacturing machines configured to manufacture a real-world part by performing a real-world version of the additive manufacturing process based on machine process parameters entered into the one or more machines and associated with the additive manufacturing process;
a real-world sensor to sense a characteristic associated with the real-world version of the additive manufacturing process; and
a machine-learning software model trained to predict a behavior of the real-world sensor based on the physics-based features, the machine process parameters, and sensor readings from the real-world sensor sensed while the one or more real-world additive manufacturing machines manufactured the real-world part during the real-world-version of the additive manufacturing process,
wherein the system is thereby configured to collect and utilize the process parameters from the one or more real-world additive manufacturing machines, real-world sensor readings from the one or more real-world additive manufacturing machines manufacturing the real-world part, and the physics-based features generated by the computer-based processor, to train the machine-learning software model to predict the behavior of the real-world sensor in a subsequent real-world version of an additive manufacturing process by the real-world additive manufacturing machine.

18. The system of claim 17, further comprising:
computer-based software for providing a computer-aided design (CAD) model of the part; and
computer-based software for producing virtual data about a machine tool path for the additive manufacturing process to produce the part based on the CAD model,
wherein the physics-based features are based at least in part on the virtual data about the machine tool path.

19. The system of claim 18, wherein the physics-based features represent energy delivered into and heat conducted out of a zone of interest during the additive manufacturing process.

20. The system of claim 19, wherein the additive manufacturing machine comprises a powder bed and a heating device to deliver heat into the powder bed,
wherein the zone of interest is an area on a surface of the powder bed, and
wherein the zone of interest is concentric with a spot where energy is being introduced into the powder bed by a heating device at a particular point of time in the additive manufacturing process.

21. The system of claim 20, wherein the zone of interest moves and remains concentric with wherever energy is being introduced into the powder bed from the heating device as the additive manufacturing process progresses.

22. The system of claim 18, wherein generating the physics-based features comprises:
generating an energy flux feature,
wherein the energy flux feature corresponds to an amount of energy delivered into a zone of interest during a particular period of time in the additive manufacturing process.

23. The system of claim 22, wherein generating the energy flux feature comprises:
integrating, with the computer-based processor, power into the zone of interest during the particular period of time, based at least in part on the virtual data about the machine tool path.

24. The system of claim 23, wherein the additive manufacturing machine comprises a heat source to deliver heat into a powder bed, and
wherein the virtual data about the machine tool path comprises time, location, and power information for the heat source in connection with the additive manufacturing process.

25. The system of claim 18, wherein generating the physics-based features comprises:
generating an effective conduction feature,
wherein the effective conduction feature corresponds to an ability to dissipate energy introduced into a zone of interest via thermal conduction.

26. The system of claim 25, wherein generating the effective conduction feature comprises:
determining how much of the zone of interest does not receive a direct delivery of energy from a heat source in the additive manufacturing machine within a finite window of time based at least in part on the virtual data about the machine tool path.

27. The system of claim 26, wherein the virtual data about the machine tool path comprises time, location, and power information for the heat source in the additive manufacturing machine.

28. The system of claim 17, wherein the machine process parameters comprise power, speed, and scan pattern information associated with the additive manufacturing process.

29. The system of claim 17, wherein the additive manufacturing process is three dimensional (3D) printing and wherein the additive manufacturing machine comprises a build platform, a powder bed atop the build platform; and a heat source configured to deliver heat into a surface of the powder bed to create the part.

30. A method of predicting a behavior of a real-world sensor in a machine for performing an additive manufacturing process to produce real-world parts, the method comprising:
collecting and utilizing process parameters from a real-world additive manufacturing machine, real-world sensor readings from the additive manufacturing machine manufacturing a real-world part, and physics-based features generated by a computer-based processor to train a machine-learning software model to predict a future behavior of the real-world sensor in a subsequent real-world version of an additive manufacturing process by the real-world additive manufacturing machine, wherein the collecting comprises:
- entering machine process parameters for an additive manufacturing process into a real-world additive manufacturing machine to produce a part via the additive manufacturing process;
- providing a real-world sensor to sense a characteristic associated with the additive manufacturing process;
- manufacturing a first real-world part with the real-world additive manufacturing machine via the additive manufacturing process;
- sensing the characteristic associated with the additive manufacturing process with the real-world sensor while the real-world machine is manufacturing the first real-world part via the additive manufacturing process;
- receiving sensor readings, representative of the characteristic, from the real-world sensor while the real-world machine is manufacturing the first real-world part via the additive manufacturing process; and
- generating, with a computer-based processor, physics-based features associated with the additive manufacturing process; and wherein the utilizing comprises:
- training a machine-learning software model based on the machine process parameters, the real-world sensor readings, and the physics-based features to predict a behavior of the real-world sensor; and
- utilizing the machine-learning software model, after the training, to predict a future behavior of the real-world sensor in a subsequent real-world version of the additive manufacturing process with the real-world machine to produce one or more subsequent real-world parts.

* * * * *